(12) United States Patent
Yun et al.

(10) Patent No.: US 10,509,897 B2
(45) Date of Patent: Dec. 17, 2019

(54) WEARABLE DEVICE AND METHOD OF OPERATING THE SAME

(71) Applicant: SAMSUNG ELECTRONICS CO., LTD., Suwon-si (KR)

(72) Inventors: In-kuk Yun, Suwon-si (KR); Je-in Yu, Seoul (KR); Dae-kwang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/353,065

(22) Filed: Mar. 14, 2019

(65) Prior Publication Data

US 2019/0205519 A1 Jul. 4, 2019

Related U.S. Application Data

(63) Continuation of application No. 14/812,436, filed on Jul. 29, 2015, now Pat. No. 10,235,510.

(30) Foreign Application Priority Data

Jul. 31, 2014 (KR) .................. 10-2014-0098645

(51) Int. Cl.
*G06F 21/32* (2013.01)
*G06F 1/16* (2006.01)
(Continued)

(52) U.S. Cl.
CPC .......... *G06F 21/32* (2013.01); *G02B 27/0172* (2013.01); *G06F 1/163* (2013.01);
(Continued)

(58) Field of Classification Search
CPC .......... G06F 21/32; G06F 21/35; G06F 21/34; G06F 19/34; G06F 21/83; G06F 21/88;
(Continued)

(56) References Cited

U.S. PATENT DOCUMENTS 8,270,681 B2 9/2012 Abe
8,624,836 B1 1/2014 Miller et al.
(Continued)

FOREIGN PATENT DOCUMENTS

CN 101773394 A 7/2010
CN 103324274 A 9/2013
(Continued)

OTHER PUBLICATIONS

Search Report dated Nov. 13, 2015, issued by the International Searching Authority in counterpart International Patent Application No. PCT/KR2015/007959 (PCT/ISA/210).
(Continued)

*Primary Examiner* — Mark S Blouin
(74) *Attorney, Agent, or Firm* — Sughrue Mion, PLLC

(57) ABSTRACT

A wearable device includes a display; a sensor configured to obtain a biometric information of a user; a memory configured to store at least one instruction; and at least one processor configured to execute the at least one instruction to: based on an event related to executing an application, identify execution of biometric authentication associated with the application; based on the identification, display a message indicating information corresponding to the biometric authentication to be performed in the wearable device; obtain, by the sensor, the biometric information of the user wearing the wearable device; identify authority using the obtained biometric information and registered biometric information stored in the memory; and display, by the display, a screen associated with the executed application based on the identified authority.

20 Claims, 26 Drawing Sheets

(51) Int. Cl.

| | | |
|---|---|---|
| *G06K 9/00* | (2006.01) | |
| *G02B 27/01* | (2006.01) | |
| *G06K 9/62* | (2006.01) | |
| *G06F 3/01* | (2006.01) | |
| *G06F 3/03* | (2006.01) | |
| *H04W 12/06* | (2009.01) | |
| *H04L 29/06* | (2006.01) | |
| *H04W 12/00* | (2009.01) | |

(52) U.S. Cl.
CPC ............ *G06F 3/014* (2013.01); *G06F 3/0304* (2013.01); *G06K 9/00885* (2013.01); *G06K 9/6201* (2013.01); *G02B 2027/014* (2013.01); *G02B 2027/0138* (2013.01); *G02B 2027/0178* (2013.01); *G06K 2009/00932* (2013.01); *H04L 63/0861* (2013.01); *H04W 12/00504* (2019.01); *H04W 12/06* (2013.01)

(58) Field of Classification Search
CPC ......... G06F 2203/0338; G06F 3/03547; G06F 3/04883; G06F 2221/2115
USPC .............................................. 340/5, 83, 5.83
See application file for complete search history.

(56) References Cited

U.S. PATENT DOCUMENTS

| | | |
|---|---|---|
| 2004/0064728 A1 | 4/2004 | Scheurich |
| 2008/0216171 A1 | 9/2008 | Sano et al. |
| 2013/0002544 A1 | 1/2013 | Noreida et al. |
| 2013/0013229 A1 | 1/2013 | Noreida et al. |
| 2013/0119255 A1 | 5/2013 | Dickinson et al. |
| 2013/0258270 A1 | 10/2013 | Cazalet et al. |
| 2013/0267204 A1* | 10/2013 | Schultz ................. H04W 12/06 455/411 |
| 2013/0291123 A1* | 10/2013 | Rajkumar ............... G06F 21/00 726/28 |
| 2014/0028546 A1 | 1/2014 | Jeon et al. |
| 2014/0062854 A1 | 3/2014 | Cho |
| 2014/0159862 A1 | 6/2014 | Yang et al. |
| 2014/0176335 A1 | 6/2014 | Brumback et al. |
| 2014/0196131 A1* | 7/2014 | Lee .......................... G06F 21/35 726/7 |
| 2014/0337607 A1* | 11/2014 | Peterson ............... G06F 9/4401 713/1 |
| 2015/0062022 A1* | 3/2015 | Rabii ....................... G06T 1/20 345/173 |

FOREIGN PATENT DOCUMENTS

| | | |
|---|---|---|
| CN | 203705641 U | 7/2014 |
| JP | 2002-312324 A | 10/2002 |
| JP | 2006-48667 A | 2/2006 |
| JP | 2012-98419 A | 5/2012 |
| KR | 10-2014-0029901 A | 3/2014 |
| WO | 2014/052505 A2 | 4/2014 |

OTHER PUBLICATIONS

Communication dated Dec. 8, 2015, issued by the European Patent Office in counterpart European Patent Application No. 15179196.9.
Written Opinion dated Nov. 13, 2015, issued by the International Searching Authority in counterpart International Patent Application No. PCT/KR2015/007959 (PCT/ISA/237).
Communication dated Apr. 19, 2019, issued by the Chinese Patent Office in counterpart Chinese Application No. 201510463422.7.

\* cited by examiner

<REGISTRATION PROCESS>

FIG. 14 facebook

Email or Phone [AAA] Password [1111] [Log In]
☐ Keep me logged in  Can't log in?

Connect with friends and the
world around you on Facebook.

See photos and updates from friends in news Feed.

Share what's new in your life on your Timeline.

Find more of what you're looking for with Graph Search.

Sign Up
It's free and always will be.

[First Name] [Last Name]
[Your Email]
[Re-enter Email]
[New Password]
Birthday
[Month ▼] [Day ▼] [Year ▼]  Why do I need to provide my birthday?
○ Female  ○ Male
By clicking Sign Up, you agree to our Terms and that you have
read our Data Use Policy, including our Cookie Use.

Sign Up

Create a Page for a celebrity, band or business.

<AUTOMATIC LOGIN>

<AUTOMATIC PAYMENT>

<REGISTRATION PROCESS>

WEARABLE DEVICE AND METHOD OF OPERATING THE SAME

CROSS-REFERENCE TO RELATED APPLICATION

This application is a continuation of application Ser. No. 14/812,436, filed Jul. 29, 2015, which is based upon and claims priority from Korean Patent Application No. 10-2014-0098645, filed on Jul. 31, 2014, in the Korean Intellectual Property Office, the disclosure of which is incorporated herein by reference in its entirety.

BACKGROUND

1. Field

Apparatuses and methods consistent with exemplary embodiments relate to a wearable device and a method of operating the same.

2. Description of the Related Art

Wearable devices, such as smart watches, smart glasses, etc., have become popular. A wearable device may capture an image of a portion or all of a user's body and may identify a user wearing the wearable device based on the captured image. For example, the smart watch may be worn on a user's wrist to capture an image of the user's veins in order to identify a user. The smart watch may also capture an image of the user's eye in order to identify a user.

Accordingly, a wearable device may allow a user to use the wearable device more conveniently and easily according to a particular usage environment of the wearable device.

SUMMARY

One or more exemplary embodiments provide a usage environment suitable for a user of a wearable device.

Additional aspects will be set forth in part in the description which follows and, in part, will be apparent from the description, or may be learned by practice of exemplary embodiments.

According to an aspect of an exemplary embodiment, there is provided a wearable device including a sensor configured to capture a vein image of a user; and a processor configured to in response to a function or an application being selected by the user, control the sensor to capture the vein image of the user wearing the wearable device; identify the user by comparing the captured vein image with at least one registered vein image; and in response to determining that the identified user has an execution authority for the selected function or application, execute the function or the application.

The function or the application may be a function or an application in which a user is predesignated.

According to an aspect of another exemplary embodiment, there is provided a wearable device including a sensor configured to capture a vein image of a user; and a processor configured to in response to determining that the user is wearing the wearable device, control the sensor to capture the vein image of the user; identify the user by comparing the captured vein image with at least one registered vein image; and change a setting of the wearable device according to setting information that is registered with respect to the identified user.

The wearable device may further include a temperature sensor configured to measure a temperature of the user, wherein the processor is further configured to, in response to determining that the measured temperature corresponds to a temperature of a body, determine that the identified user is wearing the wearable device.

The wearable device may further include a pulse sensor configured to measure a pulse of the user, wherein the processor is further configured to, in response to determining that the measured pulse corresponds to a pulse of a body, determine that the identified user is wearing the wearable device.

The processor may be further configured to perform a wireless communication connection according to a wireless communication setting that is registered with respect to the identified user.

The processor may be further configured to change the setting of the wearable device by using a brightness and a ringtone that is registered with respect to the identified user.

According to an aspect of another exemplary embodiment, there is provided a wearable device including a sensor configured to capture a vein image of a user; a display configured to display a contact list; and a processor configured to: in response to a contact function being selected, control the sensor to capture the vein image of the user; identify the user by comparing the captured vein image with at least one registered vein image; and control the display to display the contact list that is registered with respect to the identified user.

According to an aspect of another exemplary embodiment, there is provided a wearable device including a sensor configured to capture a vein image of a user; a display configured to display a music list; and a processor configured to: in response to a music player being selected, control the sensor to capture the vein image of the user; identify the user by comparing the captured vein image with at least one registered vein image; and control the display unit to display the music list registered with respect to the identified user.

According to an aspect of another exemplary embodiment, there is provided a wearable device including a processor configured to: in response to the user selecting an SNS function, control the sensor to capture the vein image of the user; identify the user by comparing the captured vein image with at least one registered vein image; and log in to the SNS by inputting authentication information that is registered with respect to the identified user.

According to an aspect of another exemplary embodiment, there is provided a method of operating a wearable device, the method including registering an execution authority of a user and a vein image of the user, for each user from among the at least one user; in response to a function or an application being selected by the user, capturing a vein image of the user wearing the wearable device; and identifying the user by comparing the captured vein image with the at least one registered vein image; and in response to determining that the identified user has the execution authority for the selected function or application, executing the function or the application.

The function or the application may be a function or an application in which a user is predesignated.

According to an aspect of another exemplary embodiment, there is provided a method of operating a wearable device, the method including registering setting information of a user and a vein image of the user, for each user from among the at least one user; in response to determining that the user is wearing the wearable device, capturing a vein image of the user; identifying the user by comparing the captured vein image with the at least one registered vein image; and changing a setting of the wearable device by using the setting information of the identified user.

The capturing may further include capturing the vein image of the user in response to a temperature of the user's body being sensed.

The registering may further include registering a wireless communication setting with respect to each user, and the changing further comprises performing a wireless communication connection according to the wireless communication setting with respect to the identified user.

The registering may further include registering at least one of a brightness and a ringtone with respect to each user, and the changing of the setting further comprises changing the setting of the wearable device by using at least one of the brightness and the ringtone registered with respect to the identified user.

According to an aspect of another exemplary embodiment, there is provided a method of operating a wearable device, the method including registering a contact list of a user and a vein image of the user, for each user from among the at least one user; in response to the user selecting a contact function, capturing a vein image of the user wearing the wearable device; identifying the user wearing the wearable device by comparing the captured vein image with the at least one registered vein image; and displaying the contact list of the identified user.

According to an aspect of another exemplary embodiment, there is provided a method of operating a wearable device, the method including registering a music list of a user and a vein image of the user, for each user from among the at least one user; in response to the user selecting a music player, capturing a vein image of the user wearing the wearable device; identifying the user wearing the wearable device by comparing the captured vein image with the at least one registered vein image; and displaying the music list of the identified user.

According to an aspect of another exemplary embodiment, there is provided a method of operating a wearable device, the method including registering SNS authentication information of a user and a vein image of the user, for each user from among the at least one user; in response to the user selecting an SNS function, capturing a vein image of the user wearing the wearable device; identifying the user wearing the wearable device by comparing the captured vein image with the at least one registered vein image; and logging in to the SNS by inputting the SNS authentication information of the identified user.

According to an aspect of another exemplary embodiment, there is provided a wearable device including a sensor configured to capture an image of a portion of a user's body; a processor configured to: compare the captured image to a database comprising at least one registered image; determine an identity of the user based on a result of the comparison; determine an execution authority of the user based on the identity of the user; and in response to determining that the user has execution authority for performing at least one of a function and an application, control the wearable device to perform the function or the application.

The portion of the user's body that is captured may include at least one of the user's vein, the user's eye, and the user's finger.

The at least one function may include providing an advertisement related to interest information based on the identity of the user.

The wearable device may further include a display configured to display messages to the user, and wherein the processor is further configured to, in response to determining that the user does not have execution authority, display a message to the user indicating that the user does not have execution authority to perform the function or the application.

The at least one function may include performing authentication with a credit card according to the identity of the user.

BRIEF DESCRIPTION OF THE DRAWINGS

These and/or other aspects will become apparent and more readily appreciated from the following description of the exemplary embodiments, taken in conjunction with the accompanying drawings in which:

FIG. 14 is a diagram illustrating a process by which a wearable device automatically performs login, according to an exemplary embodiment;

DETAILED DESCRIPTION

Figure 1:
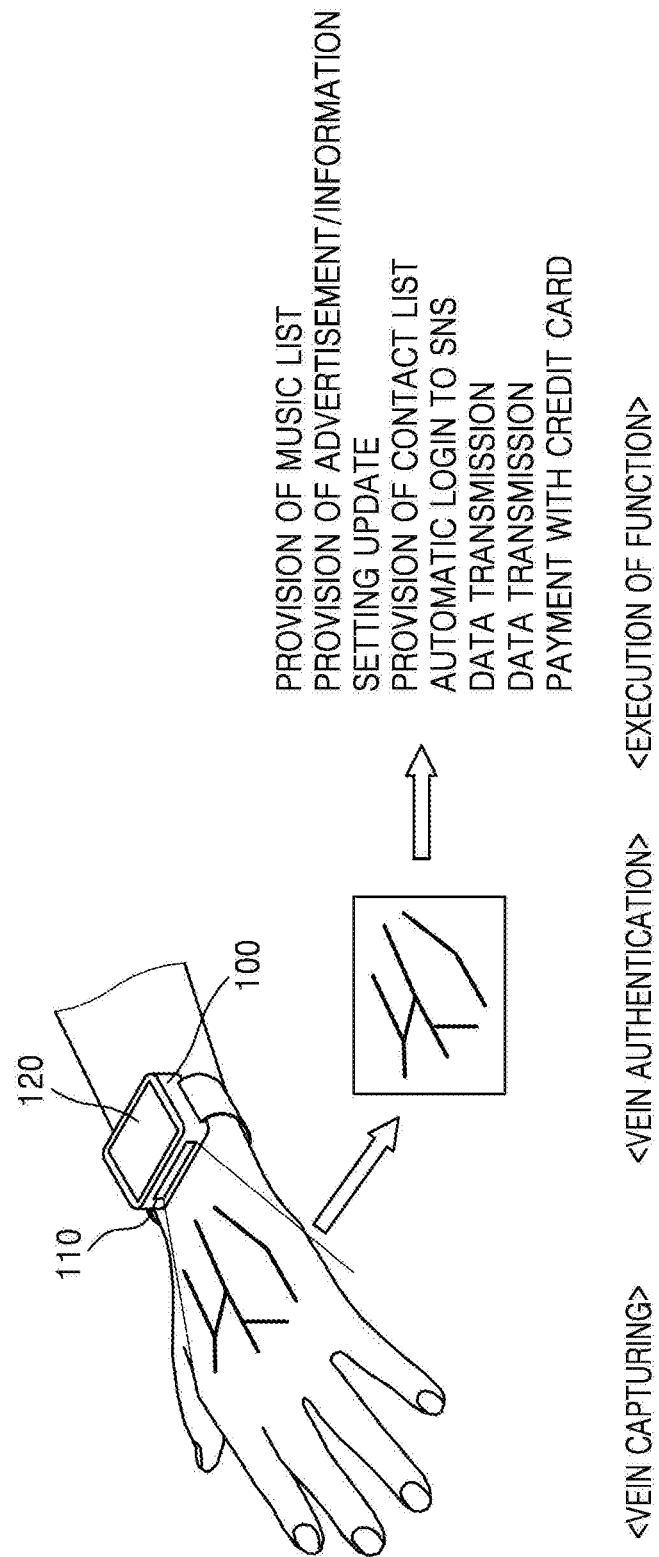
FIG. 1 is a diagram illustrating a wearable device that performs various functions through vein authentication, according to an exemplary embodiment.

Reference will now be made in detail to exemplary embodiments, examples of which are illustrated in the accompanying drawings, in which like reference numerals refer to like elements throughout. In this regard, the present exemplary embodiments may have different forms and should not be construed as being limited to the descriptions set forth herein. The exemplary embodiments are merely described below, by referring to the figures, to explain exemplary aspects of the present disclosure. As used herein, the term "and/or" includes any and all combinations of one or more of the associated listed items. Expressions such as "at least one of," when preceding a list of elements, modify the entire list of elements and do not modify the individual elements of the list.

It should be understood that, although the terms "first", "second", "third", etc. may be used herein to describe various elements, these elements should not be limited by these terms. These terms are only used to distinguish one element from another. For example, a first element may be referred to as a second element, and similarly, a second element may be referred to as a first element.

The terminology used herein is for the purpose of describing particular embodiments only and is not intended to limit the inventive concepts. As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a diagram illustrating a wearable device 100 that performs various functions through vein authentication, according to an exemplary embodiment.

The wearable device 100 may include a sensor 110 and a display unit 120 (e.g., display). The sensor 110 may perform a variety of functions such as capturing a vein image of a user or sensing a body temperature of the user. The display unit 120 may display at least one of an image, an icon, a clock, a video, etc.

The wearable device 100 may capture an image of the veins of the user to acquire the vein image. The wearable device 100 may capture the vein image in response to a predetermined situation occurring. For example, the wearable device 100 may sense a particular situation, such as a user putting on or taking off the wearable device 100, a user's performing a particular operation, a specific function being executed, or a particular application being executed, etc.

According to an exemplary embodiment, the wearable device 100 may capture the vein image when the user wears the wearable device 100. For example, the wearable device 100 may determine whether the user is currently wearing the wearable device 100. Further, the wearable device 100 may generate an event at the time when the user wears the wearable device 100. An event may refer to a predetermined situation that arises in which the wearable device responds by performing a predetermined action. For example, when the wearable device 100 determines that the user is currently wearing the device, the wearable device 100 generates an event and the wearable device 100 may capture the vein image. According to an exemplary embodiment, the wearable device 100 may determine through various sensors whether the user wears the wearable device 100. Then, the sensor may generate the event at the time when the user wears the wearable device 100.

In another exemplary embodiment, the wearable device 100 may capture the vein image when a function or a program that requires a user's authority is selected. For example, the wearable device 100 may generate an event at the time when a particular function or program is executed. When the event is generated, the wearable device 100 may capture the vein image. The function or the program that requires the user's authority may be preset by the user. In addition, a specific function or a specific program may request the user's authority. The executing of the function may be the wearable device 100 processing data, changing contents displayed on the display unit 120, or changing a plurality of pieces of set data. The program may a music player, a video player, a game, or another application installed on the wearable device 100.

According to an exemplary embodiment, the wearable device 100 may perform vein authentication by comparing the captured vein image with a registered vein image stored in memory or stored in an external server. The performing of the vein authentication may include determining whether any of the registered vein images matches the captured vein image.

According to an exemplary embodiment, when a plurality of registered vein images are provided, the wearable device 100 may sequentially compare the captured vein image with each of the registered vein images to select the registered vein image that matches the captured vein image. The matching of the captured vein image to the registered vein image may represent that the captured vein image matches the registered vein image in a set ratio or more by comparing the captured vein image with the registered vein image. In other words, there may be an error value attached to the matching of the captured vein image to the registered vein image, and when the error is a set critical value or less, the wearable device 100 may determine that the captured vein image matches the registered vein image.

According to an exemplary embodiment, the wearable device 100 may execute the function or the application without a separate user input by using data registered with respect to an identified user. Therefore, when a function or a program that requires user authentication is selected, the wearable device 100 may receive no separate input from the user and may automatically capture the vein image of the user to perform the user authentication. In other words, when the user has authority to use the function or the program, i.e., the user has a matching vein structure, the selected function or the selected program may be automatically executed without any input from the user. On the other hand, when the user has no authority to use the function or the program, i.e., the user does not have a matching vein structure, the selected function or the selected program may not be executed.

According to an exemplary embodiment, the wearable device 100 may execute various functions by using authentication. For example, the wearable device 100 may provide a music list according to music preferred by an authenticated user. The wearable device 100 may provide an advertisement or information in which the authenticated user is interested. The wearable device 100 may update a setting thereof according to the authenticated user. The wearable device 100 may provide a contact list of the authenticated user. The wearable device 100 may perform automatic login to an SNS accessed by the user. The wearable device 100 may be configured to only transmit data when the authenticated user has authority to transmit data. The wearable device 100 may attempt to connect to other devices by using information registered by the authenticated user. The wearable device 100 may attempt payment with a credit card by using information registered by the authenticated user. Functions provided by the wearable device 100 to the user will be described in detail below with reference to the drawings.

Figure 2:
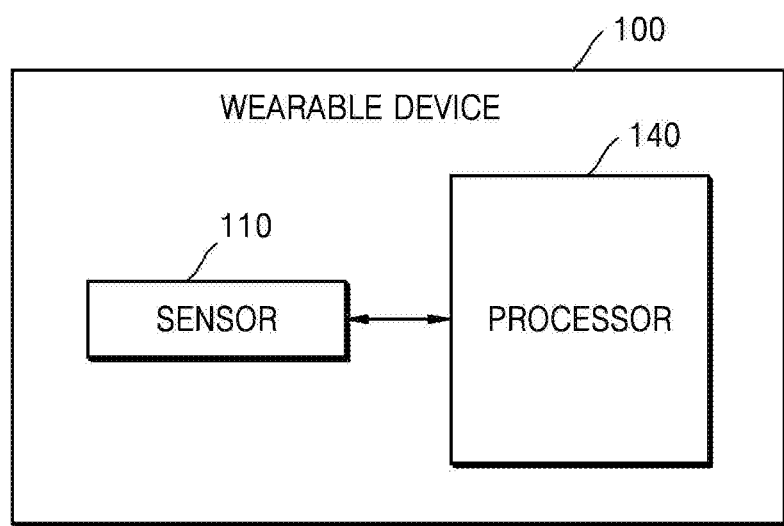
FIG. 2 is a block diagram illustrating a wearable device according to an exemplary embodiment.

FIG. 2 is a block diagram of a wearable device 100 according to an exemplary embodiment. Referring to FIG. 2, the wearable device 100 may include a sensor 110 and a processor 140. According to an exemplary embodiment, the wearable device may include a controller that may include the processor 140.

The sensor 110 may capture a vein image. The sensor 110 may include a light source and a camera. The light source may emit an infrared ray, etc., and the camera may capture the vein image. While the infrared ray is emitted from the light source, the camera may capture an image of the back of user's hand, or another part of the body, to acquire the vein image. Since a portion in which a vein is disposed has high infrared reflectivity compared to other portions of the back of hand, the camera may capture a reflected infrared ray to capture the vein image.

According to an exemplary embodiment, the sensor 110 may capture an image of biological information capable of identifying the user. The identifying the user may include determining who is the user currently wearing the wearable device 100, or who is the user from among a plurality of registered users, which is wearing the wearable device 100. For example, the sensor 110 may capture an image of biological information on a user's vein, iris, or finger, etc. As another example, the sensor 110 may capture vein images of both the user's hands. As yet another example, the sensor 110 may capture vein images of the back of the user's hand and the palm of the user's hand. According to an exemplary embodiment, the sensor 110 may capture iris images of both of a user's eyes.

In response to a function or an application, which requires authentication, being selected, the processor 140 may control the sensor 110 to capture the vein image of the user wearing the wearable device 100. The selecting the function or the application may include a user selecting the function or the application by using an input unit (e.g., inputter) in order to execute the function or the application.

The processor 140 may then identify the user by comparing the captured vein image with a registered vein image from among a plurality of registered vein images. The processor 140 may identify the user currently wearing the wearable device 100. The identifying of the user may include determining any user who wears the wearable device 100 from among a plurality of users. In other words, the identifying of the user may include determining a registered vein image from among a plurality of registered vein images, which matches the vein image of the user currently wearing the wearable device 100. The comparing of the vein images may represent comparing shapes, structures, and/or thicknesses of veins included in the captured vein image and the registered vein images.

According to an exemplary embodiment, the processor may execute a function of an application if it is determined that the user has execution authority. For example, the processor 140 may identify the user and may determine whether the identified user has the execution authority. A user with authority to execute each particular function or application may be predetermined. If a user has no execution authority, the processor 140 may provide feedback indicating that the user has no execution authority.

According to an exemplary embodiment, the processor 140 may provide data registered with respect to the identified user. For example, the processor 140 may store different contact lists of each user. When the user selects a function for providing a contact list, the processor 140 may identify the user through the vein authentication and may provide the contact list registered with respect to the identified user.

Figure 3:
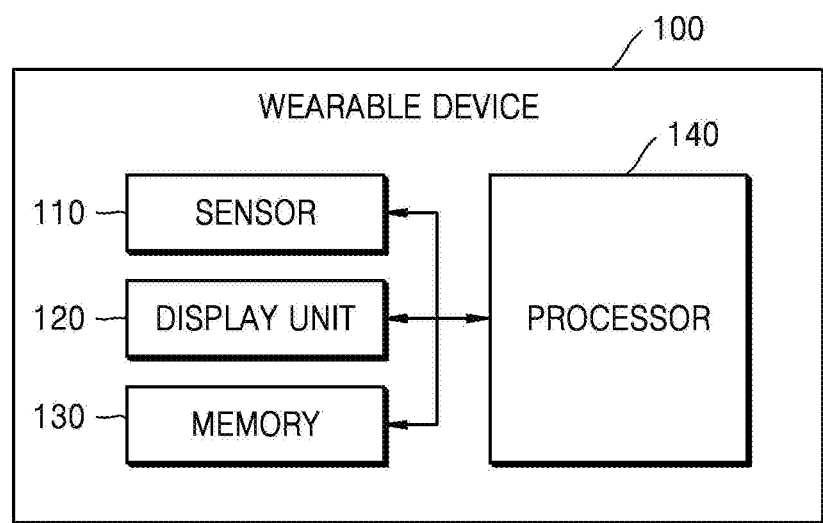
FIG. 3 is a block diagram illustrating a wearable device according to an exemplary embodiment.

FIG. 3 is a block diagram of a wearable device 100 according to an exemplary embodiment. Referring to FIG. 3, the wearable device 100 may include a sensor 110, a display unit 120, a memory 130, and a processor 140.

The memory 130 may store biological information which may be used to identify a user. For example, the memory 130 may store biological information about a user's vein, iris, pulse, or finger. The memory 130 may store vein images of both of a user's hands. The memory 130 may store vein images of the back of a user's hand and the palm of a user's hand. The memory 130 may store iris images of both of a user's eyes.

According to an exemplary embodiment, the memory 130 may store a user's data. For example the memory 130 may store a user's music list or contact list, and setting information or interest information about the user. The setting information may include information for wireless communication such as Wi-Fi, 3G, or LTE. In addition, the setting information may include notification information such as a vibration or a ringtone.

The memory 130 may also store user authentication information. For example, the memory 130 may store credit card information, SNS information, etc. The credit card information may include a credit card number, a credit card expiration date, a password, or the like. The SNS information may include an SNS address, an identification (ID), a password, or the like.

The display unit 120 may display a screen for controlling an electronic device through control of a processor 140. The display unit 120 may be a touch panel that receives an input from the user (e.g., touchscreen).

According to an exemplary embodiment, the display unit 120 may display an authentication process. For example, the display unit 120 may display a message while authentication is being performed. In addition, the display unit 120 may display a captured vein image.

Figure 4:
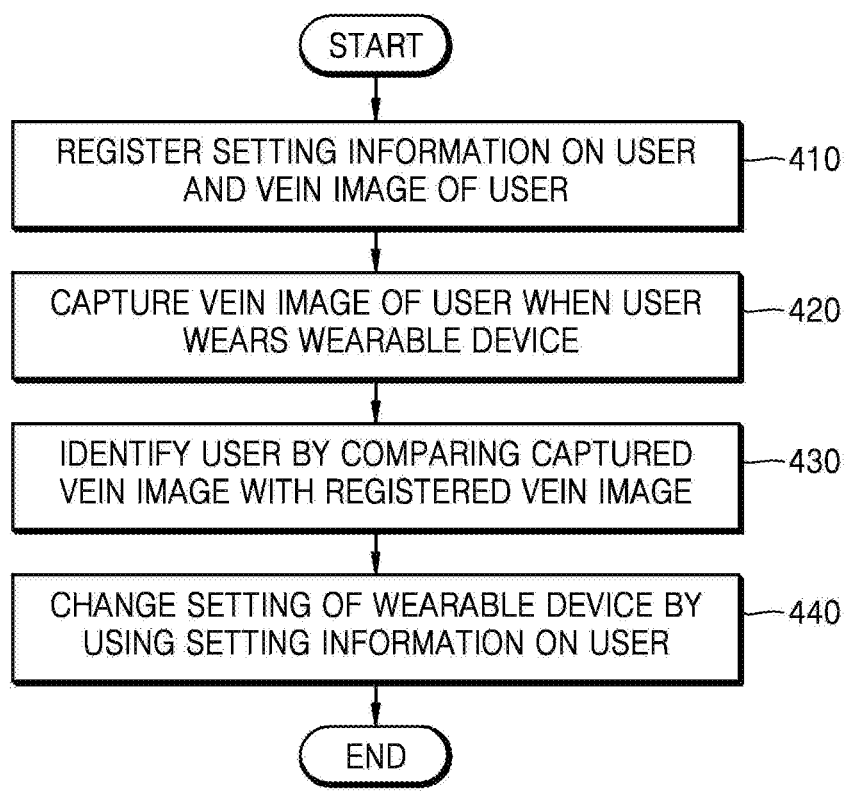
FIG. 4 is a flowchart illustrating a method by which a wearable device changes a setting thereof, according to an exemplary embodiment.

FIG. 4 is a flowchart of a method by which a wearable device 100 changes a setting thereof, according to an exemplary embodiment. Referring to FIG. 4, the wearable device 100 may update a setting of a user through vein authentication.

In operation 410, the wearable device 100 may register setting information about a user and a vein image of the user. The setting information may be information for wireless communication, notification information, or the like. The wearable device 100 may receive the setting information from the user and may register the received setting information. For example, the wearable device 100 may receive information from the user about whether the wearable device 100 performs wireless communication connection through Wi-Fi or LTE. In addition, the wearable device 100 may receive a vibration magnitude, a ringtone volume, and/or a ringtone type from the user. The wearable device 100 may also capture and store a vein image and may store the setting information inputted by the user.

In operation 420, the wearable device 100 may capture a vein image of the user when the user is wearing the wearable device 100. The wearable device 100 may sense whether a user is wearing the wearable device 100. When it is determined that a user is wearing the wearable device 100, the wearable device 100 may capture the vein image of the user wearing the wearable device 100.

According to an exemplary embodiment, the wearable device 100 may sense whether a user is wearing the wearable device 100 based on a buckle (e.g., strap), a body temperature sensor, a pulse sensor, a proximity sensor, etc.; however, exemplary embodiments are not limited to these sensing methods.

The buckle may represent a portion that fixes the wearable device 100 to a user's body. When the buckle is fastened to the wearable device 100, the wearable device 100 may determine that a user is wearing the wearable device 100.

According to another exemplary embodiment, when a body temperature of the user is sensed by the body temperature sensor, the wearable device 100 may determine that a user is wearing the wearable device 100. The body temperature sensor may be disposed on a contact portion of the wearable device, i.e., the portion that contacts the user when the user wears the wearable device 100.

According to another exemplary embodiment, when a pulse of the user is sensed by the pulse sensor, the wearable device 100 may determine that a user is wearing the wearable device 100. The pulse sensor may be disposed on a portion of the wearable device that contacts the user when the user wears the wearable device 100. For example, in the case of a smart watch, the pulse sensor may be disposed on a portion that comes into contact with a lower portion of a user's wrist.

According to another exemplary embodiment, the wearable device 100 may determine through a proximity sensor whether a user is wearing the wearable device 100. The proximity sensor may be disposed on the contact portion when the user is wearing the wearable device 100. For example, in the case of a smart watch, the proximity sensor may be disposed below the display unit 120 to measure a distance between the smart watch and the user's wrist.

In operation 430, the wearable device 100 may identify the user by comparing the captured vein image with a registered vein image. The wearable device 100 may search for a vein image from among a plurality of vein images stored in the memory 130 that matches the captured vein image. When the wearable device 100 determines that the captured vein image and the registered vein image match each other by a predetermined ratio or more, in terms of a structure, or the like, the wearable device 100 may determine that the captured vein image and the registered vein image match each other. The wearable device 100 may then identify which user is wearing the wearable device 100 by determining which user corresponds to the matching registered vein image.

In operation 440, the wearable device 100 may change a setting of the wearable device 100 by using the setting information of the user. For example, the wearable device 100 may use setting information registered of the user that corresponds to the registered vein image that matches the captured vein image. In other words, the wearable device 100 may use setting information registered with respect to the identified user. The setting information may include information that determines a state of the wearable device 100. The wearable device 100 may change its state based on the setting information of the identified user. For example, the wearable device 100 may confirm music registered with respect to the identified user and may change a ringtone to the confirmed music. In addition, the wearable device 100 may confirm a wireless connection type registered with respect to the identified user and may change the confirmed wireless connection type to Wi-Fi or LTE accordingly.

Figure 5:
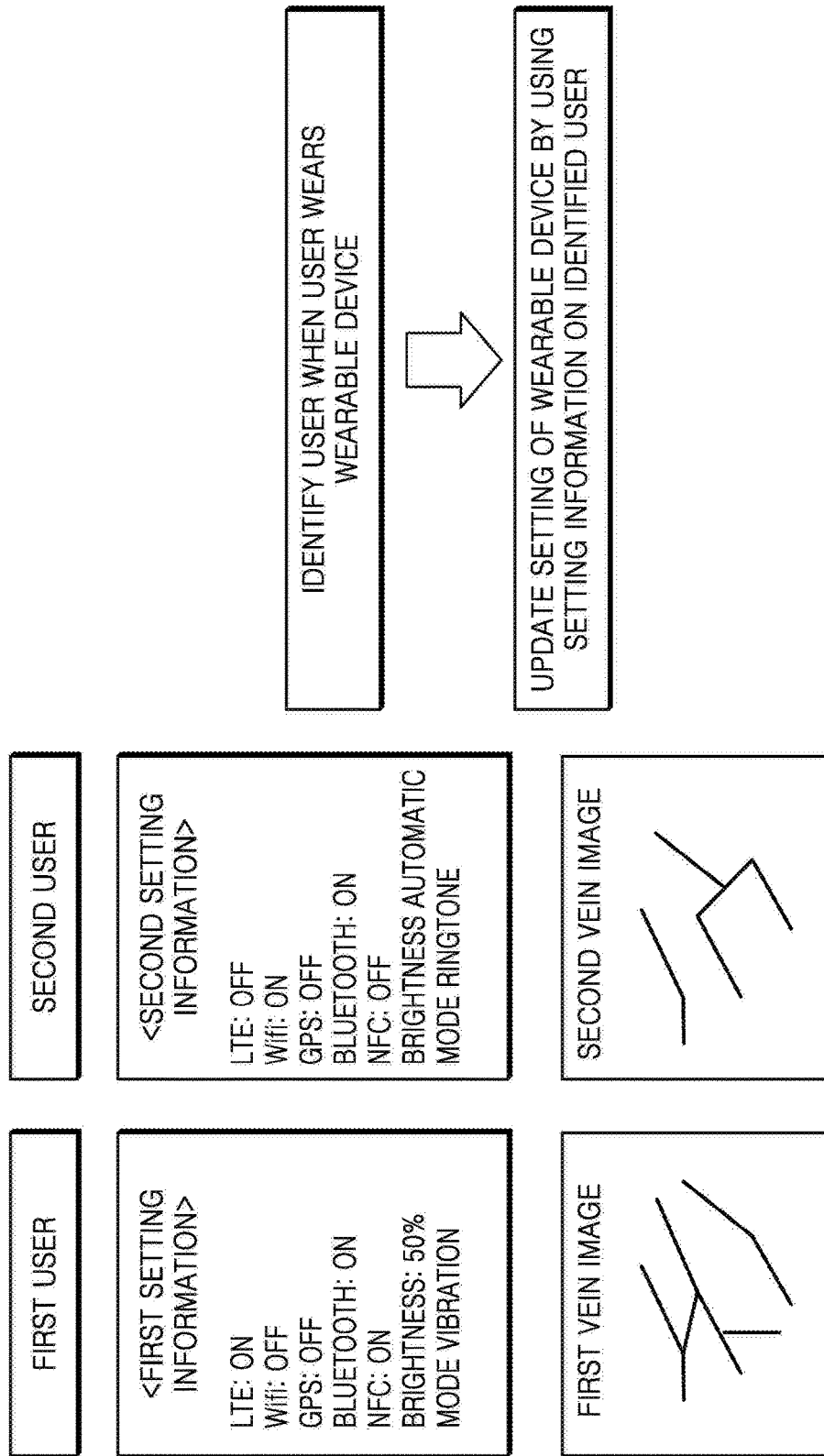
FIG. 5 is a diagram illustrating a process by which a wearable device changes a setting thereof, according to an exemplary embodiment.

FIG. 5 is a diagram illustrating a process by which a wearable device 100 changes a setting thereof, according to an exemplary embodiment. Referring to FIG. 5, when a user wears the wearable device 100, the wearable device 100 may identify the user wearing the wearable device 100. The wearable device 100 may update a setting thereof by using setting information of the identified user.

For example, when a first user wears the wearable device 100, the wearable device 100 may compare a captured vein image with first and second vein images. If the captured vein image matches the first vein image, the wearable device 100 may determine that the first user wears the wearable device 100. The wearable device 100 may update the setting thereof by using first setting information registered with respect to the first user.

The memory 130 of the wearable device 100 may store the first setting information of the first user and second setting information of a second user. The first setting information may be setting information registered with respect to the first user. The second setting information may be setting information registered with respect to the second user.

In addition, the memory 130 may store first and second vein images of the first and second users. The first vein image may be a vein image of the first user. The second vein image may be a vein image of the second user.

The first setting information may indicate that LTE is set to an ON state, Wi-Fi is set to an OFF state, GPS is set to an OFF state, Bluetooth is set to an ON state, NFC is set to an ON state, brightness is set to 50%, and a mode is set to a vibration mode. For example, when the first user is wearing the wearable device 100, the wearable device 100 may perform wireless communication connection by using the LTE and may disconnect a Wi-Fi connection.

The second setting information may indicate that the LTE is set to an OFF state, the Wi-Fi is set to an ON state, the GPS is set to an OFF state, the Bluetooth is set to an ON state, the NFC is set to an OFF state, the brightness is set to an automatic mode, and the mode is set to a ringtone mode. For example, when the second user wears the wearable device 100, the wearable device 100 may perform the wireless communication connection by using the Wi-Fi and may disconnect a LTE connection.

The storage of the first setting information, the second setting information, and the first and second vein images with respect to the first and the second users has been described with reference to FIG. 5, but the number of the stored users is not limited, and a plurality of pieces of setting information and vein images with respect to three or more users may be stored in the memory 130. Furthermore, the setting information is not limited to these pieces of information.

Figure 6:
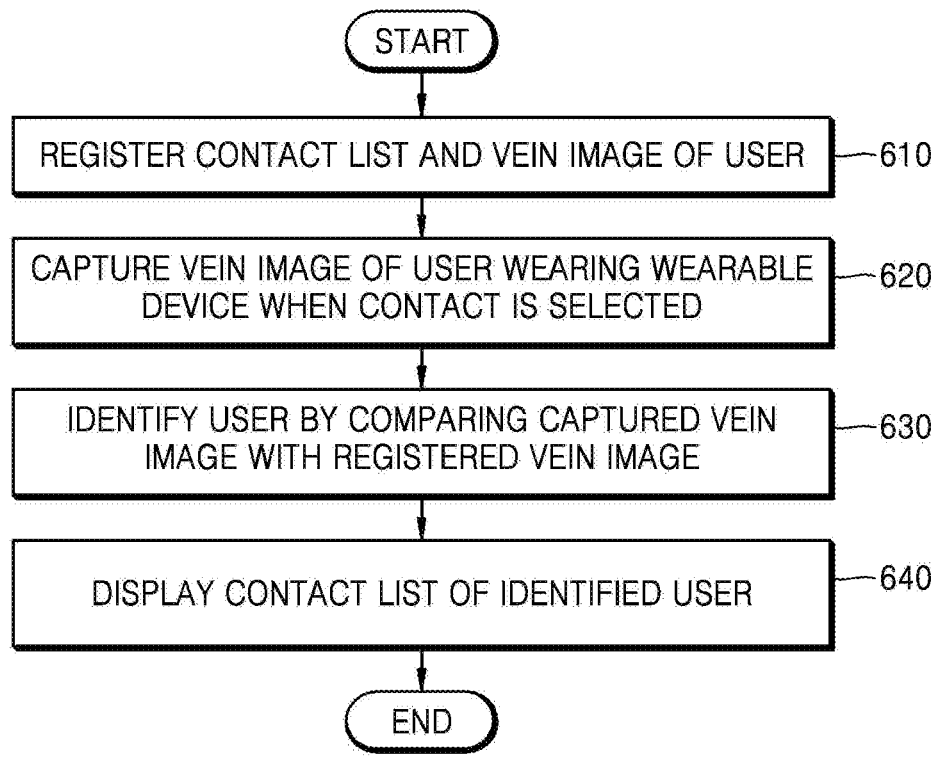
FIG. 6 is a flowchart illustrating a method by which a wearable device displays a contact list, according to an exemplary embodiment.

FIG. 6 is a flowchart of a method by which a wearable device 100 displays a contact list, according to an exemplary embodiment. Referring to FIG. 6, when a contact is selected, the wearable device 100 may provide a contact list of an identified user.

In operation 610, the wearable device 100 may register the contact list of a user and a vein image of the user. The contact list may include a cellular phone number, a home phone number, an office phone number, a fax number, etc.

In operation 620, when the contact function is selected, the wearable device 100 may capture a vein image of the user wearing the wearable device 100. The selecting of the contact function may represent that the user executes a phone function through an input device of the wearable device 100 or selects a contact icon. In other words, the selecting the contact function may include all cases that the wearable device 100 displays the contact list. The input device may be a device such as a touch panel, a touchscreen, or a mouse. When the contact list is selected, the wearable device 100 may generate an event, which may control the sensor 110 to capture the vein image.

Since the wearable device 100 may store different contact lists for each user, it is necessary to provide the contact list registered with respect to the user currently wearing the wearable device 100. Therefore, the wearable device 100 may control the sensor 110 to capture the vein image in order to identify the user wearing the wearable device 100.

In operation 630, the wearable device 100 may identify the user wearing the wearable device 100 by comparing the captured vein image with the registered vein images.

In operation 640, the wearable device 100 may display the contact list corresponding to the identified user on the display unit 120. The wearable device 100 may control the display unit 120 so as to display the contact list of the identified user.

Since the wearable device 100 provides the contact list to the user through vein authentication, although many users use the wearable device 100, only the user currently wearing the device may view his or her own contact list. Therefore, the wearable device 100 may protect personal information.

Figure 7:
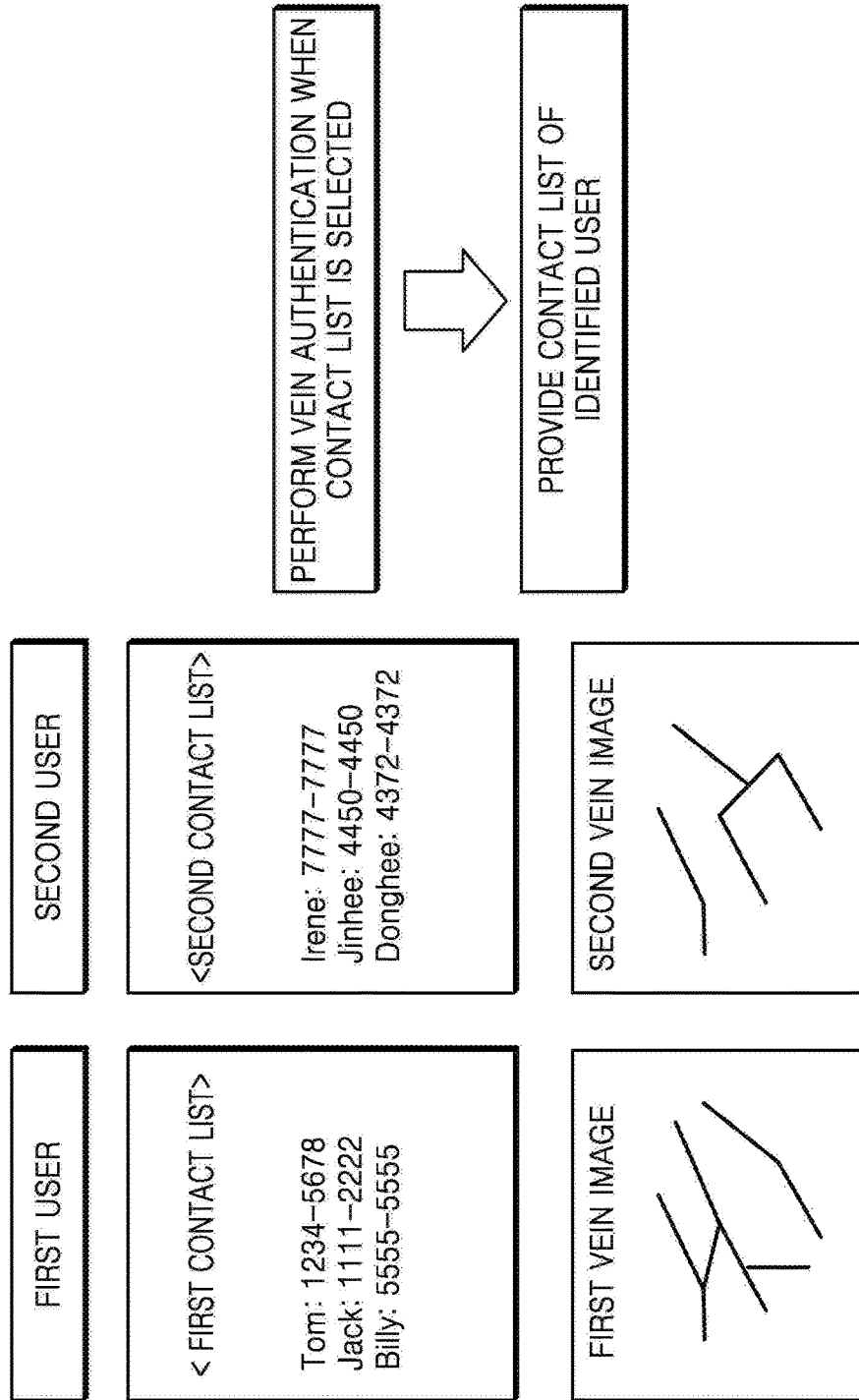
FIG. 7 is a diagram illustrating a process by which a wearable device provides a contact list, according to an exemplary embodiment.

FIG. 7 is a diagram illustrating a process by which a wearable device 100 provides a contact list, according to an exemplary embodiment. Referring to FIG. 7, when a contact function is selected, the wearable device 100 may provide a contact list registered with respect to the user that is wearing the wearable device 100.

For example, when a first user is wearing the wearable device 100 and selects the contact, the wearable device 100 may perform vein authentication. During this process, the wearable device 100 may compare a captured vein image with registered first and second vein images. If the captured vein image matches the first vein image, the wearable device 100 may determine that the first user wears the wearable device 100. The wearable device 100 may provide a first contact list registered with respect to the first user.

The memory 130 of the wearable device 100 may store vein images of first and second users. The first vein image may be a vein image of the first user. The second vein image may be a vein image of the second user. In addition, the memory 130 may store first and second contact lists. The first contact list may include contacts registered by the first user. The second contact list may include contacts registered by the second user.

As an example, illustrated in FIG. 7, the first contact list may include phone numbers of Tom, Jack, and Billy. The second contact list may include phone numbers of Irene, Jinhee, and Donghee.

The storage of the first and second contact lists and the first and second vein images with respect to the first and second users has been described with reference to FIG. 7, but the number of the stored users is not limited, and contact lists and vein images of three or more users may be stored in the memory 130.

Figure 8:
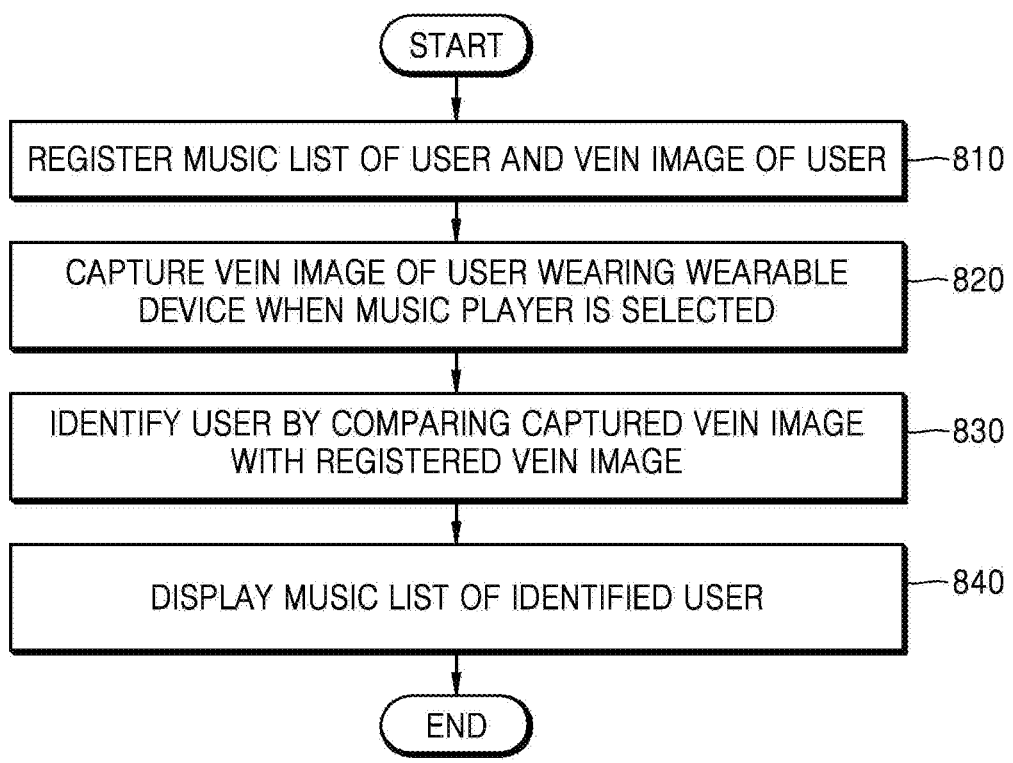
FIG. 8 is a flowchart illustrating a method by which a wearable device provides a music list, according to an exemplary embodiment.

FIG. 8 is a flowchart of a method by which a wearable device 100 provides a music list, according to an exemplary embodiment. Referring to FIG. 8, when a music player is selected, the wearable device 100 may provide a music list registered by an identified user.

In operation 810, the wearable device 100 may register the music list of the user and a vein image of the user. The music list may include songs registered by the user.

In operation 820, when the music player is selected, the wearable device 100 may capture a vein image of the user wearing the wearable device 100. The selecting of the music player may represent that the user executes the music player through the input device of the wearable device 100. The music player may represent any programs that play a song.

Since the wearable device 100 stores different music lists for each user, it is necessary to provide the music list registered with respect to the user wearing the wearable device 100. Therefore, the wearable device 100 may control the sensor 110 to capture the vein image in order to identify the user wearing the wearable device 100.

In operation 830, the wearable device 100 may identify the user wearing the wearable device 100 by comparing the captured vein image with the registered vein images.

In operation 840, the wearable device 100 may display the music list of the identified user on the display unit 120. The wearable device 100 may control the display unit 120 so as to display the music list of the identified user.

Since the wearable device 100 provides the music list to the user through vein authentication, the wearable device 100 may provide music registered by the user wearing the wearable device 100 even in the absence of a separate input.

Figure 9:
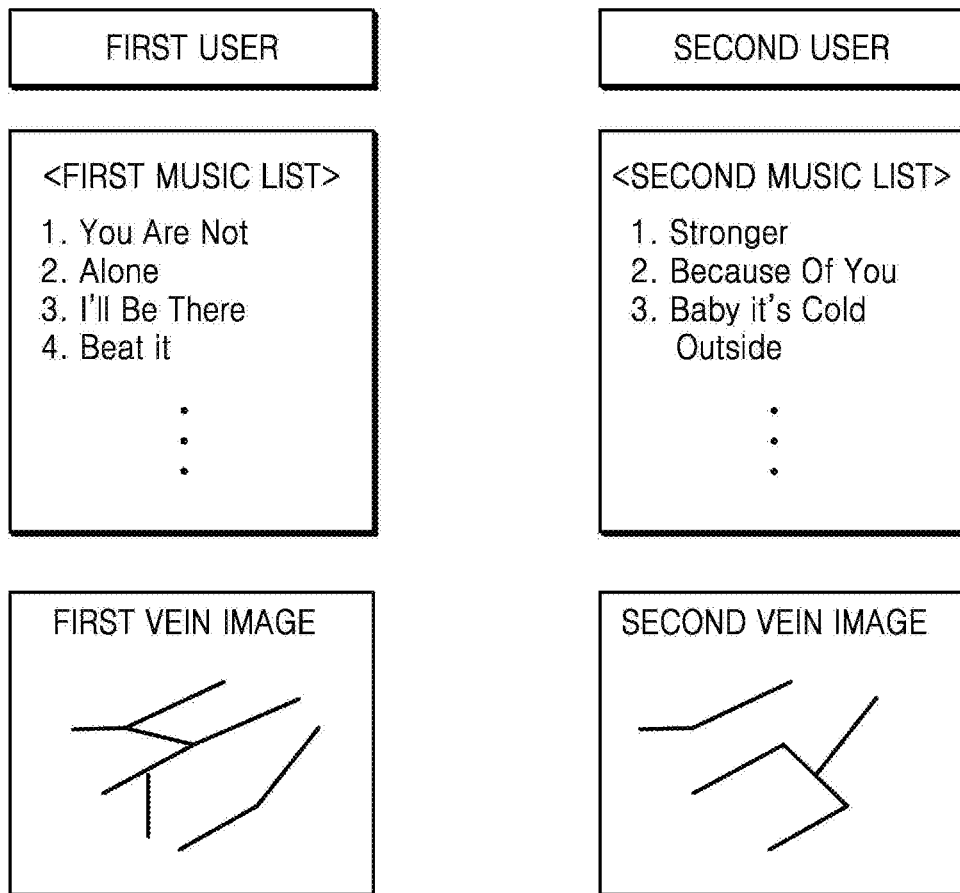
FIG. 9 is a diagram illustrating a process by which a wearable device provides a music list, according to an exemplary embodiment.

FIG. 9 is a diagram illustrating a process by which a wearable device 100 provides a music list, according to an exemplary embodiment. Referring to FIG. 9, when a music player is selected, the wearable device 100 may provide a music list registered with respect to an identified user.

For example, when a first user wears the wearable device 100 and selects the music player, the wearable device 100 may perform vein authentication. In other words, the wearable device 100 may compare a captured vein image with registered first and second vein images. If the captured vein image matches the first vein image, the wearable device 100 may determine that the first user wears the wearable device 100. The wearable device 100 may then provide a first music list registered with respect to the first user.

According to an exemplary embodiment, the memory 130 of the wearable device 100 may store vein images of first and second users. The first vein image may be a vein image of the first user. The second vein image may be a vein image of the second user.

In addition, the memory 130 may store first and second music lists. The first music list may include songs registered by the first user. The second music list may include songs registered by the second user. As an example, the first music list may include songs such as You Are Not Alone, I'll Be There, and Beat it, and the second music list may include songs such as Stronger, Because Of You, and Baby it's Cold Outside.

Figure 10:
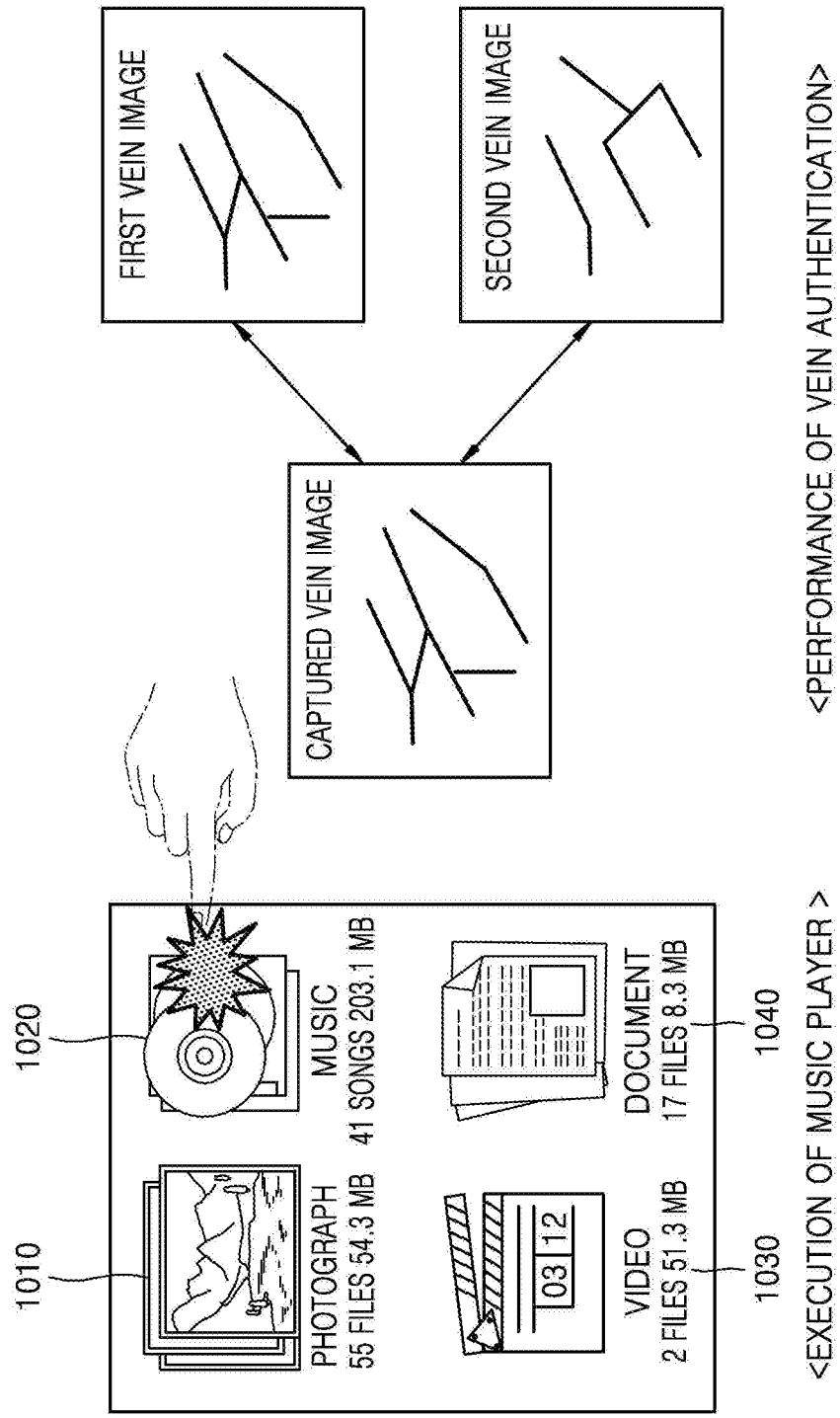
FIG. 10 is a diagram illustrating a timing of performing vein authentication, according to an exemplary embodiment.

FIG. 10 is a diagram for illustrating the timing of performing vein authentication. Referring to FIG. 10, a wearable device 100 may perform vein authentication at the time when a music player is executed. More specifically, the wearable device 100 may perform the vein authentication before the user selects and executes the music player. The wearable device 100 may execute the music player after the vein authentication is completed.

FIG. 10 illustrates that a photograph icon 1010, a music icon 1020, a video icon 1030, and a document icon 1040 are disposed in the wearable device 100. The photograph icon 1010, the music icon 1020, the video icon 1030, and the document icon 1040 may each represent a program or an application that executes each of the respective functions. When the photograph icon 1010 is selected, the wearable device 100 may execute a function of displaying photographs. When the music icon 1020 is selected, the wearable device 100 may execute a function of playing a song. When the video icon 1030 is selected, the wearable device 100 may execute a function of playing a video. When the document icon 1040 is selected, the wearable device 100 may execute a program of performing a document operation.

As illustrated in FIG. 10, when the user touches the music icon 1020, the wearable device 100 may sense a touch input as an event and may perform the vein authentication. The wearable device 100 may control the sensor 110 to capture a vein image of the user. The wearable device 100 may identify the user by comparing the captured vein image with registered first and second vein images.

Figure 11:
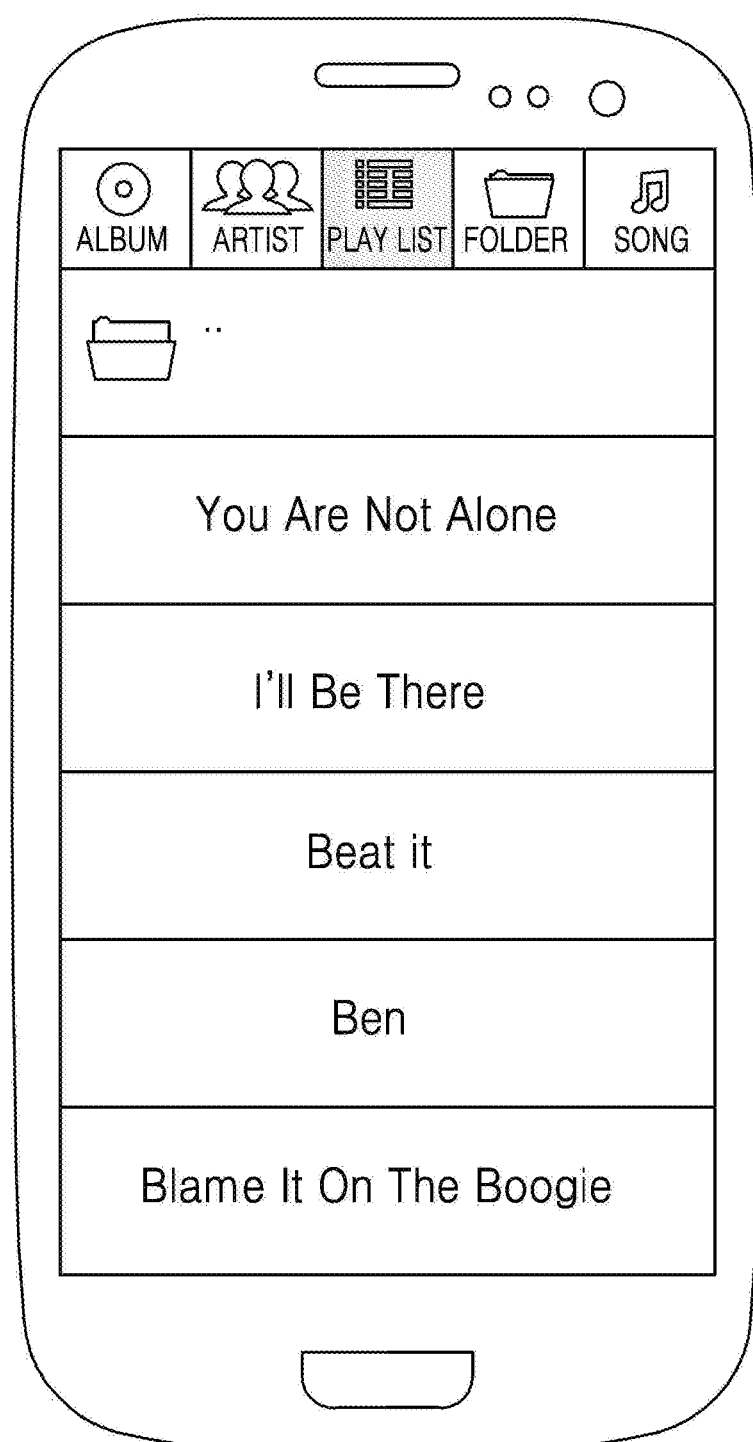
FIG. 11 is a diagram illustrating that a wearable device provides a music list with respect to an identified user, according to an exemplary embodiment.

FIG. 11 is a diagram illustrating that a wearable device 100 provides a music list with respect to an identified user, according to an exemplary embodiment. If the wearable device 100 determines that the first user of the FIG. 9 is wearing the wearable device 100, then it may provide a first music list of registered music lists. Therefore, the wearable device 100 may display songs such as You Are Not Alone, I'll Be There, and Beat it, on the display unit 120.

Figure 12:
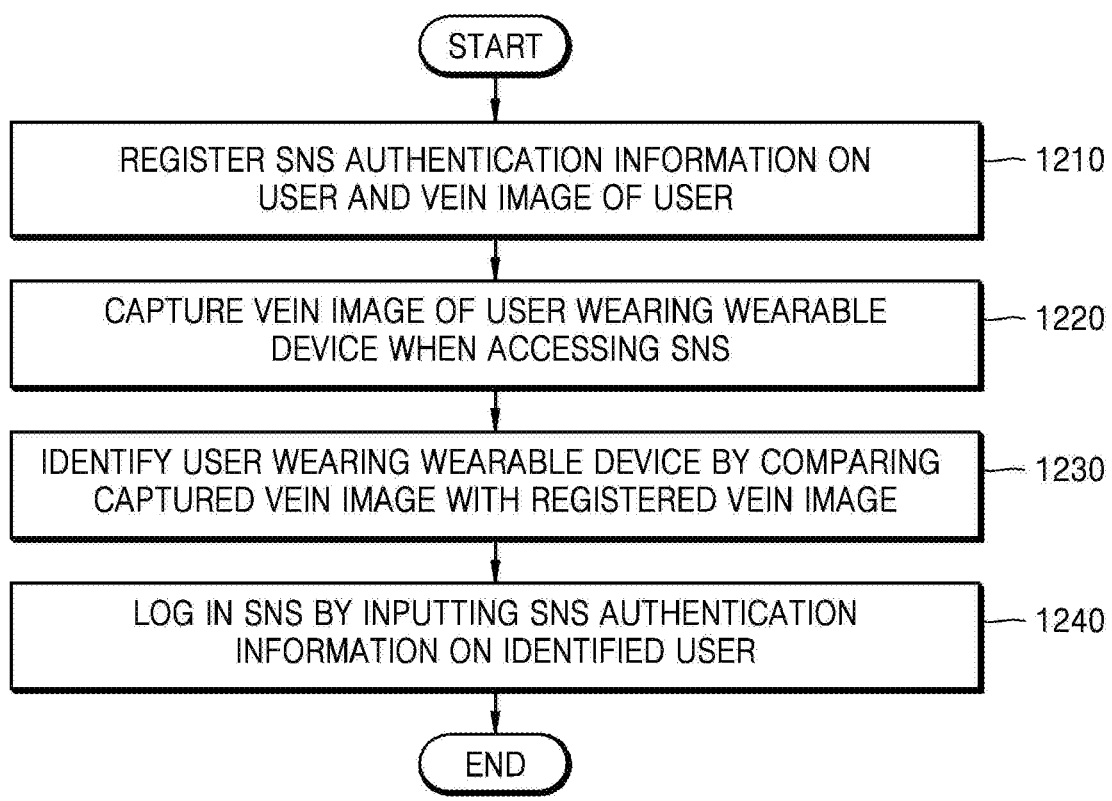
FIG. 12 is a flowchart illustrating a method by which a wearable device logs in an SNS, according to an exemplary embodiment.

FIG. 12 is a flowchart of a method by which a wearable device 100 logs in an SNS, according to an exemplary embodiment. Referring to FIG. 12, when accessing a registered SNS, the wearable device 100 may attempt to log in the SNS by inputting an ID and a password of an identified user.

In operation 1210, the wearable device 100 may register SNS authentication information for the user and a vein image of the user. For example, the SNS authentication information may include the ID and the password. An SNS authentication number may separately be registered for each type of SNS. For example, the wearable device 100 may store different IDs and passwords with respect to a Facebook account and a Twitter account. In addition, the SNS as well as a website for performing a login may be registered together with the ID and the password by using authentication information.

In operation 1220, when accessing the SNS, the wearable device 100 may capture a vein image of the user wearing the wearable device 100. When a registered SNS address registered is inputted in a Web browser, the wearable device 100 may control the sensor 110 to capture the vein image.

In operation 1230, the wearable device 100 may identify the user wearing the wearable device 100 by comparing the captured vein image with the registered vein images.

In operation 1240, the wearable device 100 may perform login to the SNS by inputting the SNS authentication information for the identified user. The wearable device 100 may perform the login to the SNS by reading the SNS authentication information registered with respect to the identified user from the memory 130.

When accessing the registered SNS, the wearable device 100 may perform the login through vein authentication by using the ID of the user wearing the wearable device 100 even in the absence of a separate input.

Figure 13:
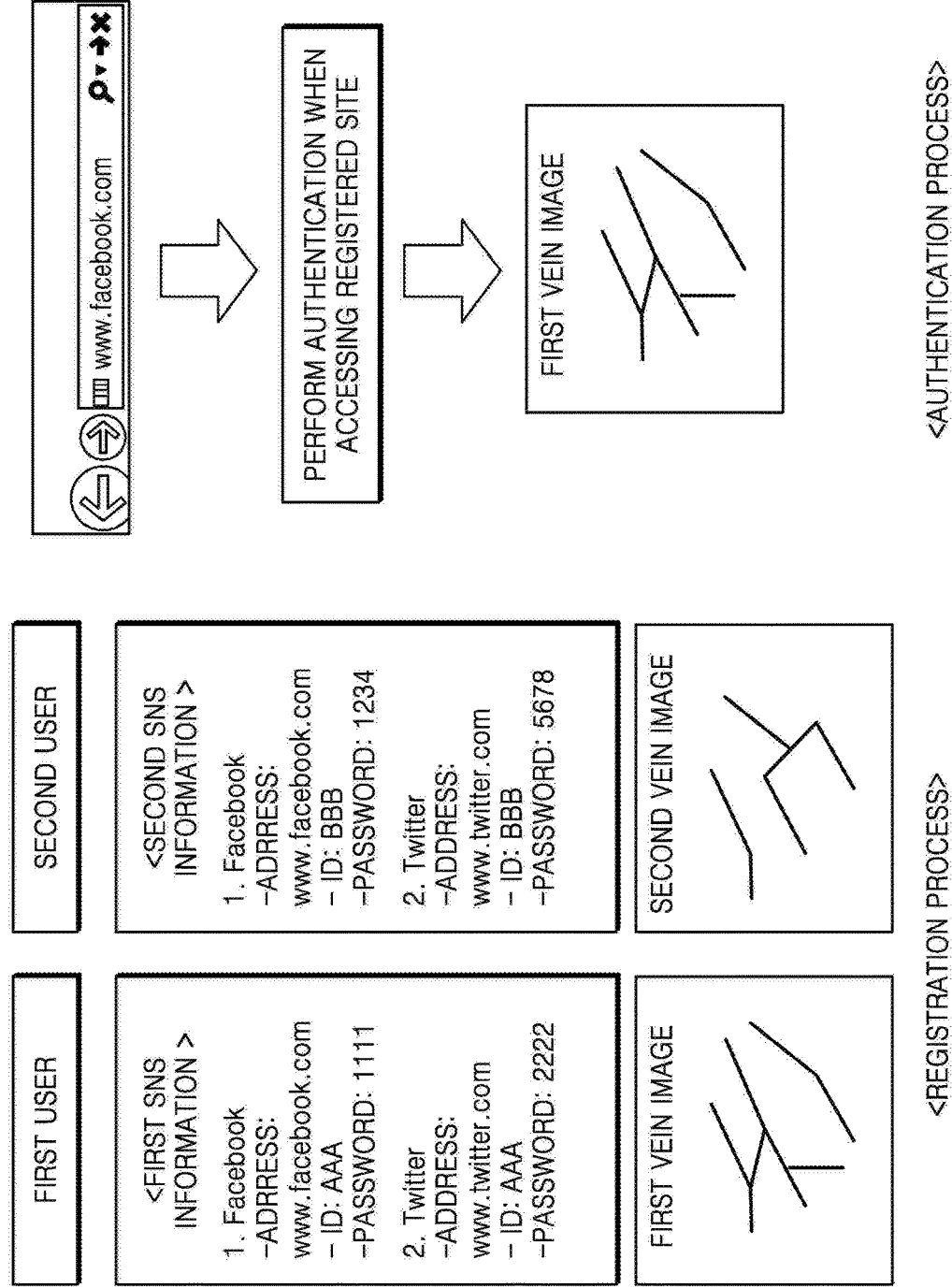
FIG. 13 is a diagram illustrating a process by which a wearable device displays automatically performs login, according to an exemplary embodiment.

FIG. 13 is a diagram illustrating a process by which a wearable device 100 displays automatically performs login, according to an exemplary embodiment. Referring to FIG. 13, when the wearable device 100 accesses a registered SNS, the wearable device 100 may attempt vein authentication to identify a user.

For example, when a first user wears the wearable device 100 and accesses FACEBOOK.COM, the wearable device 100 may perform the vein authentication. In other words, the wearable device 100 may compare a captured vein image with registered first and second vein images. If the captured vein image matches the first vein image, the wearable device 100 may determine that the first user is wearing the wearable device 100. The wearable device 100 may attempt login by using first SNS information for the first user.

FIG. 14 is a diagram illustrating a process by which a wearable device 100 automatically performs login, according to an exemplary embodiment. Referring to FIG. 14, when a Web browser accesses Facebook, the wearable device 100 may automatically perform login. If, as a result of vein authentication, a user wearing the wearable device 100 is a first user, the wearable device 100 may perform the login based on first SNS information registered with respect to the first user. Since an ID and a password of the Facebook respectively are AAA and 1111 in the first SNS information, the wearable device 100 may input AAA and 1111 in a Web site.

The SNS has been described with reference to FIGS. 12 to 14, but the wearable device 100 may also perform the login in the same manner as described above in the case of all Web sites performing a login by inputting the authentication information similar to the case of the SNS. The wearable device 100 may store a vein image, a Web site address, an ID, and a password. When the stored Web site address is inputted in the Web browser, the wearable device 100 may perform the login by inputting the ID and the password of the user authenticated through vein authentication.

Figure 15:
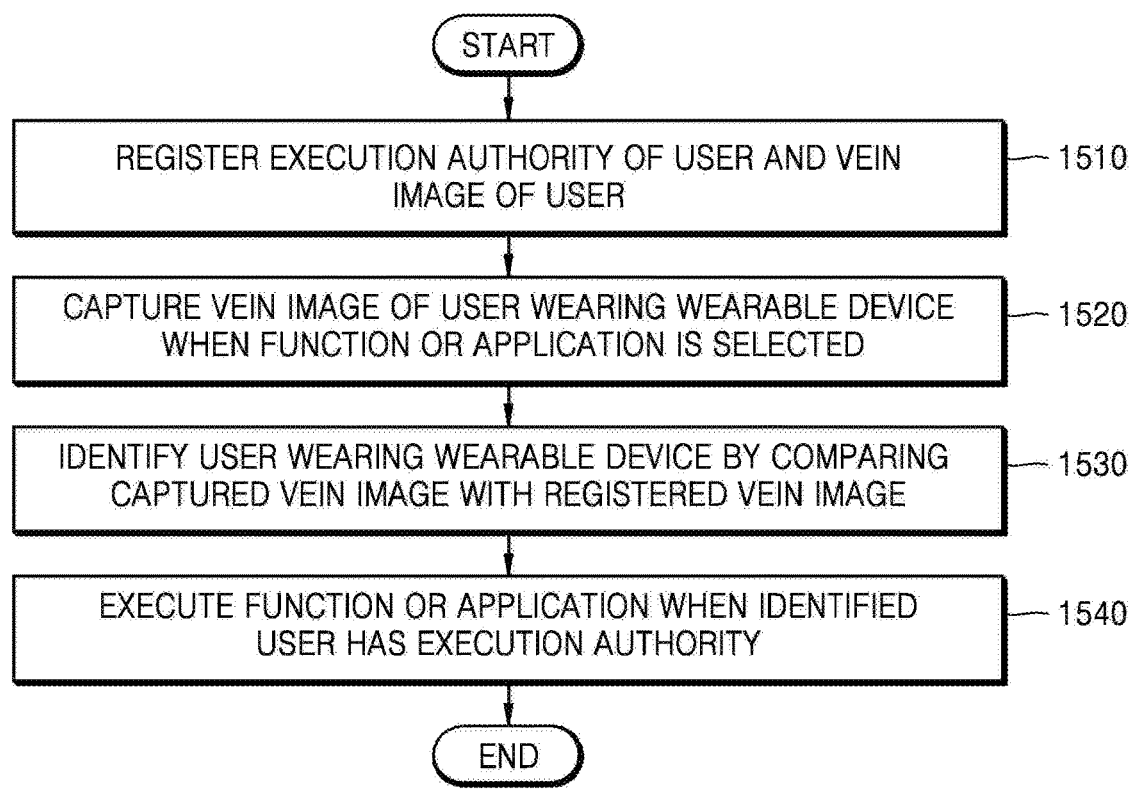
FIG. 15 is a flowchart illustrating a method by which a wearable device selectively executes a function or an application, according to an exemplary embodiment.

FIG. 15 is a flowchart of a method by which a wearable device 100 selectively executes a function or an application, according to an exemplary embodiment. Referring to FIG. 15, when a function or an application that requires authentication is selected, the wearable device 100 may determine through vein authentication whether the function or the application should be executed.

In operation 1510, the wearable device 100 may register execution authority of a user and a vein image of the user. The wearable device 100 may register a function or an application available to each user. In other words, the wearable device 100 may register execution authority of each function and each application for each user. For example, the wearable device 100 may store that a first user has authority to execute a function C and an application A, and a second user has authority to execute a function A, a function B, and an application B. Multiple functions and applications may be available to a particular user, just as multiple users may have authority to access a particular function or application.

In operation 1520, when the function or the application is selected, the wearable device 100 may capture a vein image of the user wearing the wearable device 100.

In operation 1530, the wearable device 100 may identify the user wearing the wearable device 100 by comparing the captured vein image with the registered vein images.

In operation 1540, if the identified user has the execution authority, the wearable device 100 may execute the function or the application. For example, when the first user wears the wearable device 100 and the application C is executed, the wearable device 100 may determine whether the first user has the authority to execute the application C, and the wearable device 100 may execute the application C only when the first user has the authority to execute the application C. When the first user no authority to execute the application C, the wearable device 100 may provide feedback to the user indicating that the application C may not be executed because he does not have the authority.

Therefore, through vein authentication, the wearable device 100 may execute the function or the application only when the user having the execution authority wears the wearable device 100.

Figure 16:
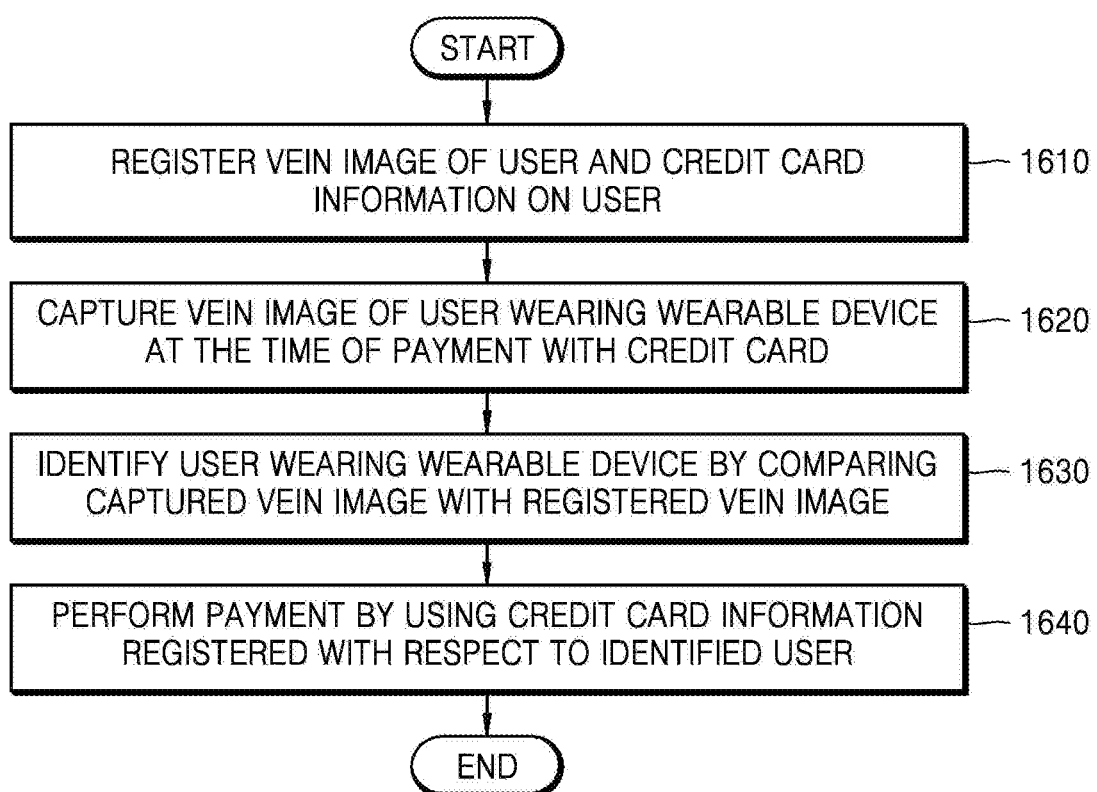
FIG. 16 is a flowchart illustrating a method by which a wearable device automatically performs payment with a credit card, according to an exemplary embodiment.

FIG. 16 is a flowchart of a method by which a wearable device 100 automatically performs payment with a credit card, according to an exemplary embodiment. Referring to FIG. 16, at the time of payment with a credit card, the wearable device 100 may perform the payment by inputting card information of an identified user through vein authentication.

In operation 1610, the wearable device 100 may register a vein image of a user and credit card information of the user. For example, the credit card information may include a card number, an expiration date, a password, etc. Any user may register a plurality of pieces of credit card information.

In operation 1620, at the time of the payment with the credit card, the wearable device 100 may capture a vein image of the user wearing the wearable device 100. When an input of the credit card information in a Web browser is displayed, the wearable device 100 may control the sensor 110 to capture the vein image. The wearable device 100 may determine through the card number, the expiration date, or the like, that the payment with the credit card is performed.

In operation 1630, the wearable device 100 may identify the user wearing the wearable device 100 by comparing the captured vein image with the registered vein images.

In operation 1640, the wearable device 100 may perform the payment by using the credit card information registered with respect to the identified user. The performing of the payment by the wearable device 100 may include inputting the registered credit card information, or inputting the credit card information and pushing a payment button to complete final payment. If there is no credit card information registered with respect to the identified user, the wearable device 100 may perform no payment. In addition, when there is a plurality of pieces of credit card information registered with respect to the identified user, the wearable device 100 may display the plurality of pieces of registered credit card information and receive an input from the user to perform the payment by using any one of the plurality of pieces of credit card information.

At the time of the payment with the credit card, the wearable device 100 may perform the payment by using the credit card information on the user wearing the wearable device 100 even in the absence of a separate input.

Figure 17:
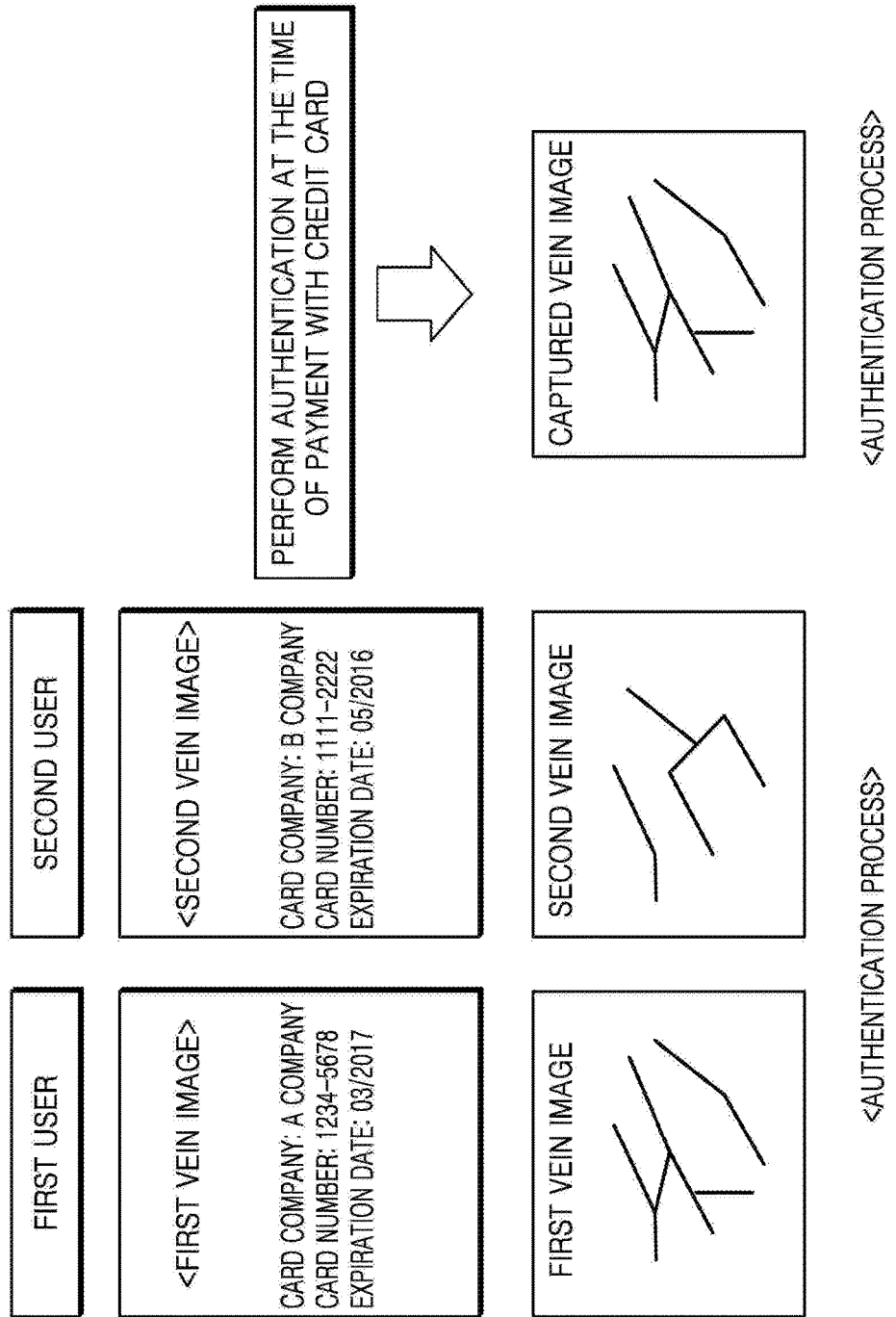
FIG. 17 is a diagram illustrating a process by which a wearable device performs payment by using registered credit card information, according to an exemplary embodiment.

FIG. 17 is a diagram illustrating a process by which a wearable device 100 performs payment by using registered credit card information, according to an exemplary embodiment. Referring to FIG. 17, the wearable device 100 may store first credit card information and second credit card information and may determine payment credit card information through vein authentication at the time of payment with a credit card.

For example, the memory 130 of the wearable device 100 may store the first credit card information, the second card information, and first and second vein images. The first credit card information may be credit card information of a first user. The second credit card information may be credit card information of a second user. The first vein image may be a vein image of the first user. The second vein image may be a vein image of the second user.

According to an exemplary embodiment, the wearable device 100 may perform vein authentication at the time of the payment with the credit card. At the time of the payment with the credit card, the wearable device 100 may capture a vein image of the user wearing the wearable device 100. The wearable device 100 may compare the captured vein image with the registered vein images. In FIG. 17, the wearable device 100 may compare the captured vein image with the first and second vein images. If the captured image matches the first vein image, the wearable device 100 may determine the user wearing the wearable device 100 as the first user.

Accordingly, the wearable device 100 may perform the payment by using the first credit card information of the first user. The first credit card information may indicate a card company A, a card number of 1234-5678, and an expiration date of March, 2017. Therefore, the wearable device 100 may perform the payment by inputting the card number and the expiration date in a Web browser.

Figure 18:
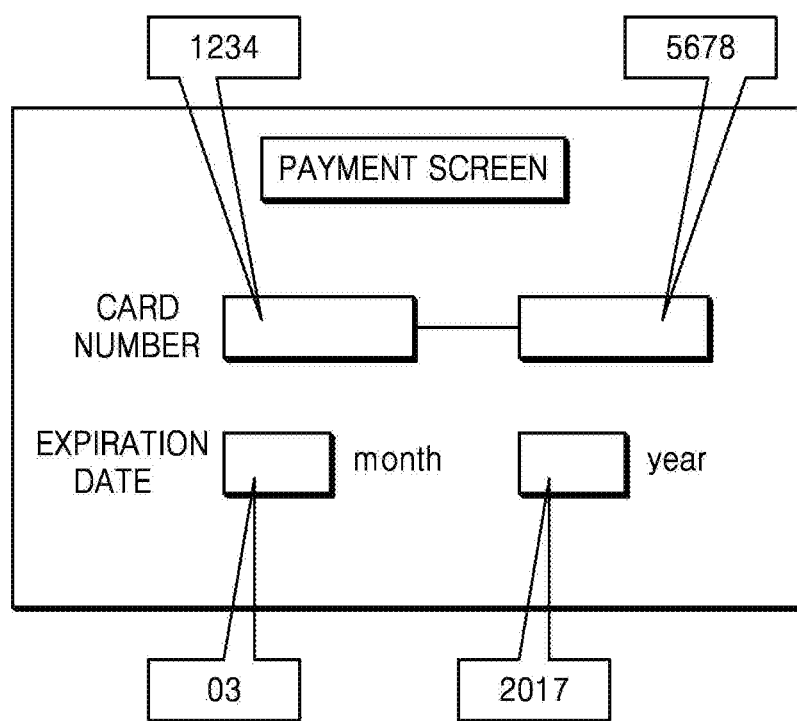
FIG. 18 is a diagram illustrating a payment screen according to an exemplary embodiment.

FIG. 18 is a diagram of a payment screen according to an exemplary embodiment. Referring to FIG. 18, a wearable device 100 may input credit card information in the payment screen.

The payment screen may include spaces in which a card number and an expiration date are inputted. The wearable device 100 may input a card number of first credit card information in the space in which the card number is inputted. The wearable device 100 may input an expiration date of the first credit card information in the space in which the expiration date is inputted.

In FIG. 18, only the card number and expiration date are shown as inputs, but additional information necessary for payment with a credit card may be registered and inputted.

Figure 19:
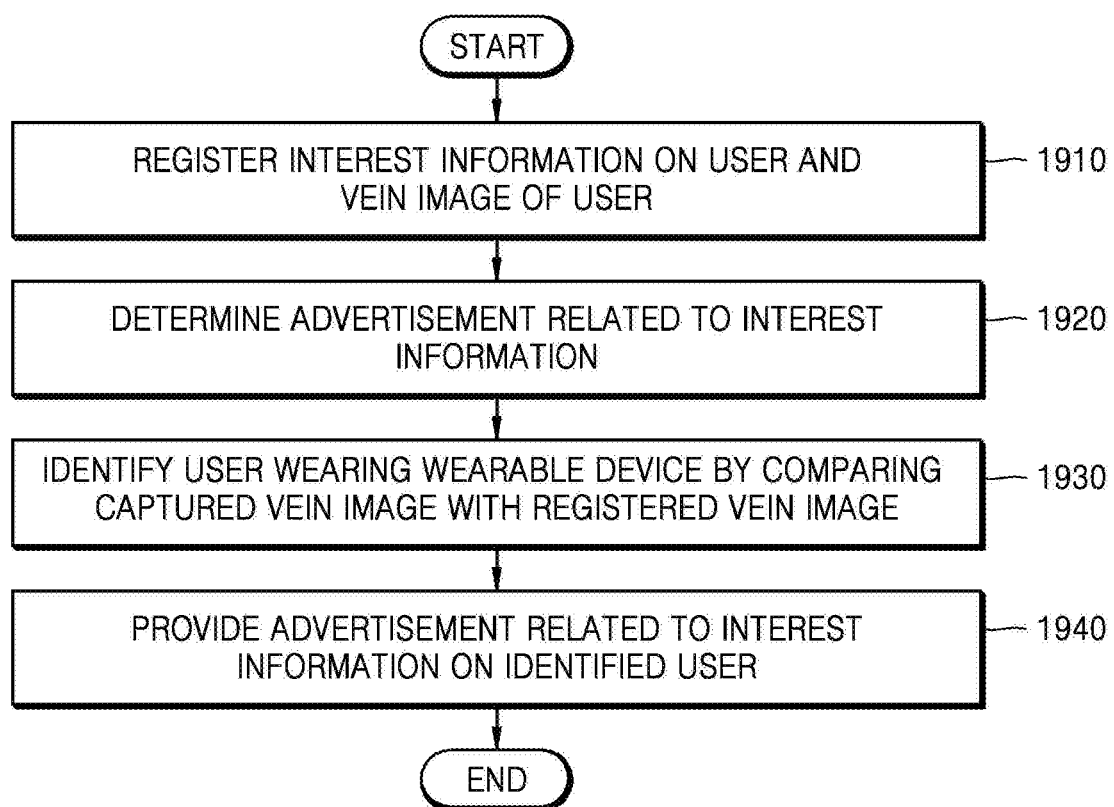
FIG. 19 is a flowchart illustrating a method by which a wearable device provides an advertisement, according to an exemplary embodiment.

FIG. 19 is a flowchart of a method by which a wearable device 100 provides an advertisement, according to an exemplary embodiment. Referring to FIG. 19, the wearable device 100 may provide an advertisement related to interest information of a user.

In operation 1910, the wearable device 100 may register the interest information of the user and a vein image of the user. The interest information may include a category in which the user wants to acquire information. For example, the interest information may include categories such as exercise, a vehicle, or travel. In addition, the interest information may be a brand, an enterprise, or the like, that may be preferred by the user.

In operation 1920, the wearable device 100 may determine the advertisement related to the interest information. The wearable device 100 may search for the advertisement by using the registered interest information. For example, when the travel is registered as the interest information of the user, the wearable device 100 may search for an advertisement including domestic travel or overseas travel information. When the vehicle is registered as the interest information on the user, the wearable device 100 may search for an advertisement of a newly released vehicle.

In operation 1930, the wearable device 100 may identify the user wearing the wearable device 100 by comparing the captured vein image with the registered vein images.

In operation 1940, the wearable device 100 may provide the advertisement related to the interest information of the identified user. The wearable device 100 may display the advertisement in the display unit 120.

Accordingly, the wearable device 100 may provide the advertisement in which the user wearing the wearable device 100 is interested, through vein authentication.

Figure 20:
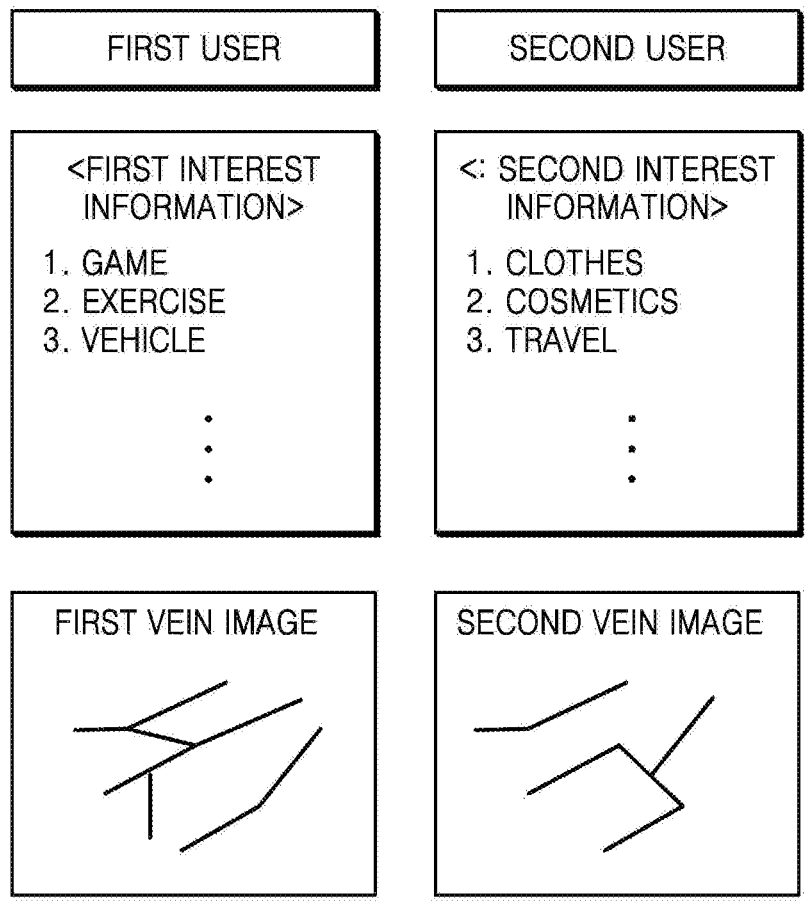
FIG. 20 is a diagram illustrating a process by which a wearable device registers interest information, according to one or more exemplary embodiment.

FIG. 20 is a diagram illustrating a process by which a wearable device 100 registers interest information, according to an exemplary embodiment. Referring to FIG. 20, the wearable device 100 may store interest information and a vein image for each user.

First interest information may be interest information registered by a first user. Second interest information may be interest information registered by a second user. The first interest information may include a game, exercise, a vehicle, or the like. The second interest information may include clothes, cosmetics, travel, or the like.

A first vein image may be a vein image of the first user. A second vein image may be a vein image of the second user.

The wearable device 100 may register the first interest information and the first vein image with respect to the first user. The wearable device 100 may register the second interest information and the second vein image with respect to the second user.

When the user wears the wearable device 100, the wearable device 100 may capture a vein image. The wearable device 100 may compare the captured vein image with the registered first and second vein images. When the captured vein image matches the first vein image, the wearable device 100 may determine an advertisement to be provided to the user based on the first interest information. The advertisement determined by the wearable device 100 may vary according to a time and a location.

Figure 21:
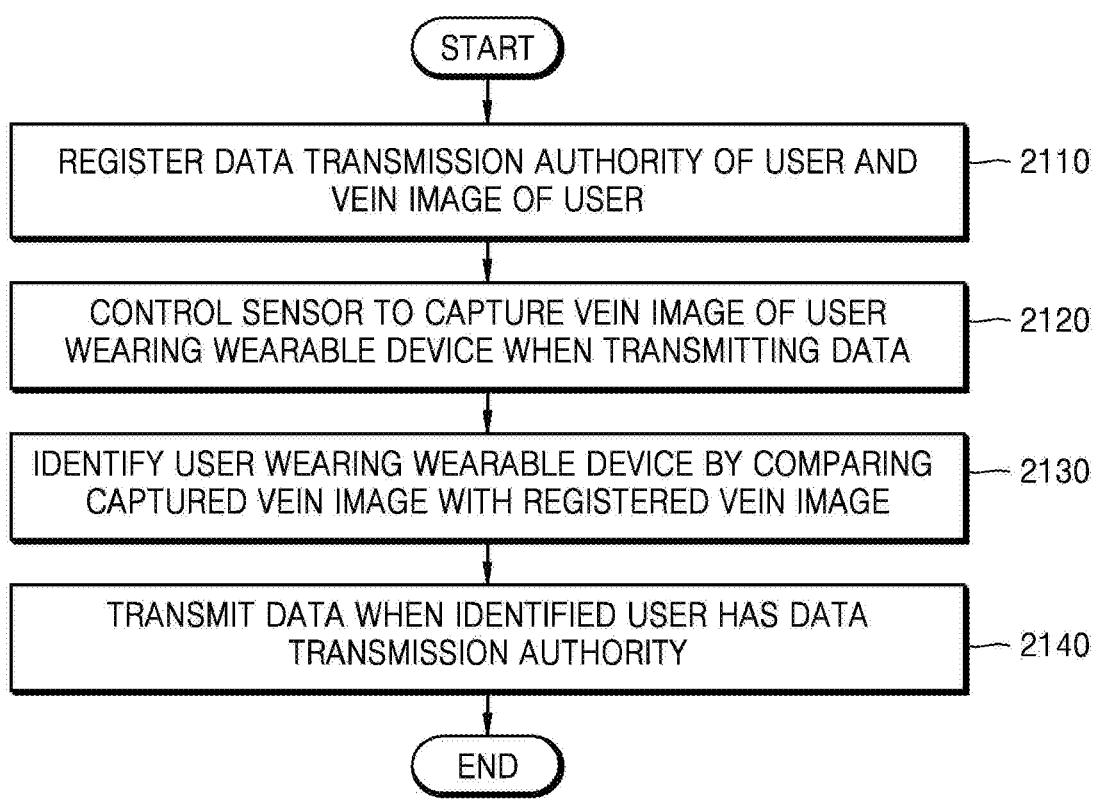
FIG. 21 is a flowchart illustrating a method by which a wearable device transmits data, according to an exemplary embodiment.

FIG. 21 is a flowchart of a method by which a wearable device 100 transmits data, according to an exemplary embodiment. Referring to FIG. 21, when transmitting data, the wearable device 100 may transmit the data only when a user has transmission authority.

In operation 2110, the wearable device 100 may register data transmission authority of the user and a vein image of the user. The data transmission authority may indicate a transmission-available data type and data volume for each user.

In operation 2120, when transmitting the data, the wearable device 100 may control the sensor 110 to capture a vein image of the user wearing the wearable device 100. When the user transmits the data to the outside of the wearable device 100, the wearable device 100 may capture the vein image. When the user transmits the data to external electronic devices, the wearable device 100 may capture the vein image and perform vein authentication before the data is transmitted.

In operation 2130, the wearable device 100 may identify the user wearing the wearable device 100 by comparing the captured vein image with the registered vein images.

In operation 2140, when the identified user has the appropriate data transmission authority, the wearable device 100 may transmit the data. The wearable device 100 may confirm the data transmission authority of the identified user. The wearable device 100 may determine based on the confirmed data transmission authority whether to currently transmit the data. When a type of the data to be currently transmitted is a type in which the user is not authorized to transmit, or a volume of the data to be currently transmitted is greater than a volume in which the user is authorized to transmit, the wearable device 100 may display the message "No Data Transmission" on a display unit 120 and may transmit no data.

In other words, the wearable device 100 may determine through vein authentication whether to transmit the data, based on the data transmission authority of the user wearing the wearable device 100.

Figure 22:
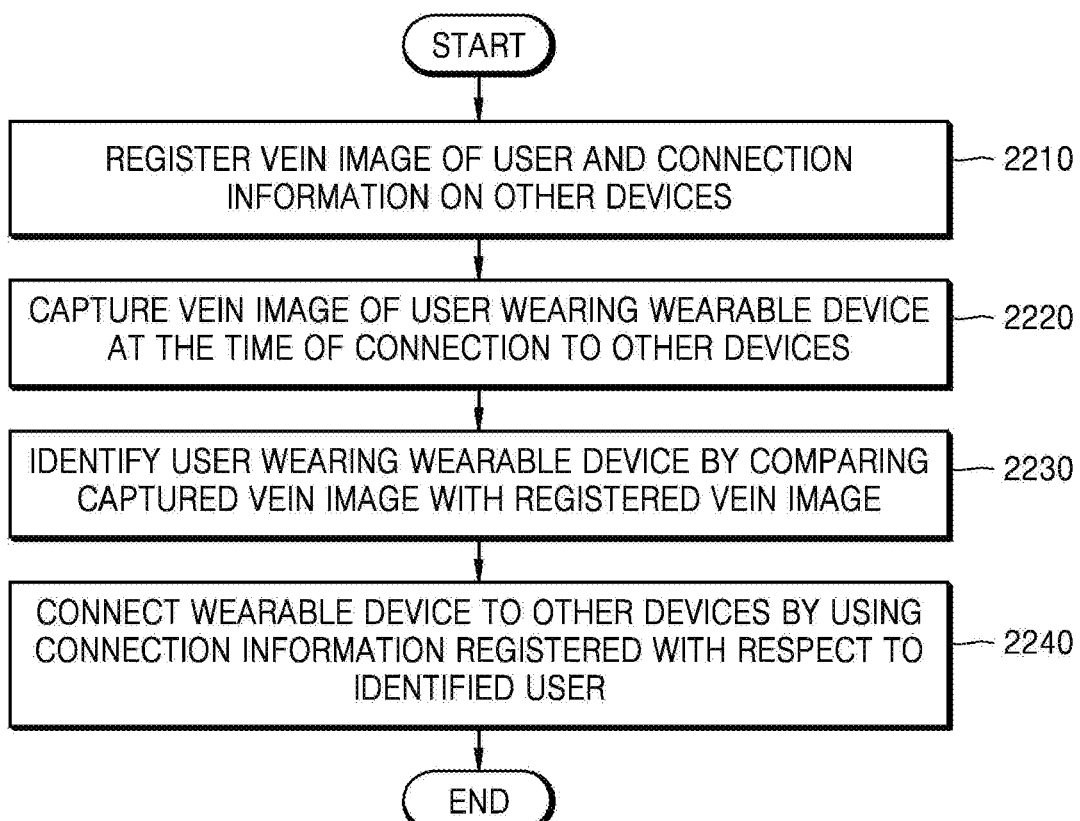
FIG. 22 is a flowchart illustrating a method by which a wearable device is connected to other devices, according to an exemplary embodiment.

FIG. 22 is a flowchart of a method by which a wearable device 100 is connected to other devices, according to an exemplary embodiment. Referring to FIG. 22, at the time of a connection to other devices, the wearable device 100 may attempt to connect to other devices by using connection information.

In operation 2210, the wearable device 100 may register a vein image of a user and connection information about other devices. The connection information may include a connection target, a password, etc.

In operation 2220, at the time of the connection to other devices, the wearable device 100 may control the sensor 110 to capture a vein image of a user wearing the wearable device 100. The connecting to other devices may include connecting the wearable device 100 to other devices, and automatically connecting the wearable device 100 to other devices when the wearable device 100 approaches other devices, according to an input of the user.

In operation 2230, the wearable device 100 may identify the user wearing the wearable device 100 by comparing the captured vein image with s registered vein images.

In operation 2240, the wearable device 100 may attempt to connect to other devices by using connection information registered with respect to the identified user. The wearable device 100 may confirm the connection information registered with respect to the identified user. The wearable device 100 may determine based on the confirmed connection information whether to attempt to connect to other devices.

The connection information may include a connection device list. Therefore, the wearable device 100 may attempt to connect only to devices included in the connection information. When a device, which attempts to connect to the wearable device 100, is not included in the connection information, the wearable device 100 may not attempt to connect to the device.

The wearable device 100 may attempt to connect to other devices by using a password included in the connection information. When a peripheral device, to which the wearable device 100 attempts to connect, requires a password, the wearable device 100 may transmit the password included in the connection information of the user to the peripheral device. When the wearable device 100 may not be connected to the peripheral device, the wearable device 100 may display a message indicating no connection on the display unit 120.

Figure 23:
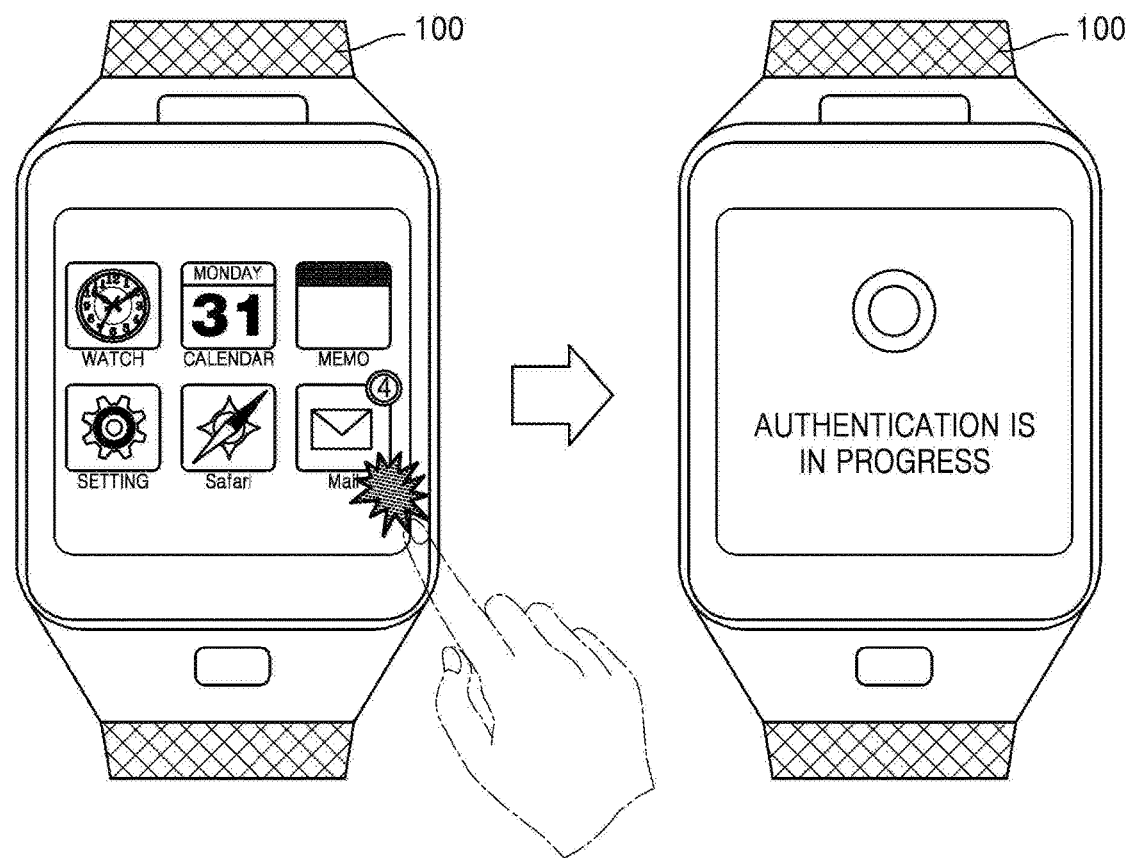
FIG. 23 is a diagram illustrating a process by which a wearable device displays a vein authentication procedure, according to an exemplary embodiment.

FIG. 23 is a diagram illustrating a process by which a wearable device 100 displays a vein authentication procedure, according to an exemplary embodiment. Referring to FIG. 23, while the wearable device 100 performs vein authentication, the wearable device 100 may display the message "In the process of performing authentication" on the display unit 120.

The case of using a smart watch has been described with reference to FIG. 23, but the message "In the process of performing authentication" may also be displayed on smart glasses.

When a user wears both the smart watch and the smart glasses, the vein authentication may be performed in the smart watch and the message may be displayed on the smart glass. In one or more exemplary embodiments, the message may be displayed on the smart watch and iris authentication may be performed in the smart glasses.

The wearable device 100 may display the message indicating the authentication process. In other words, the wearable device 100 may display, on the display unit 120, the message indicating that the wearable device 100 is in the process of performing the authentication and the message indicating whether the wearable device 100 is in the process of performing the vein authentication or the iris authentication. In addition, the wearable device 100 may display a capturing angle with respect to a vein or an iris and may change the capturing angle according to a user input.

According to an exemplary embodiment, the wearable device 100 may display a process of generating a vein image. For example, the wearable device 100 may display, on the display unit 120, a process of capturing the vein image and generating the vein image. The wearable device 100 may provide an image of cross-comparing the captured vein image with a registered vein image.

According to an exemplary embodiment, the wearable device 100 may display a process of generating the iris image. For example, the wearable device 100 may display, on the display unit 120, a process of capturing the iris image and generating the iris image.

According to an exemplary embodiment, the wearable device 100 may display a process of measuring a pulse. For example, the wearable device 100 may display, on the display unit 120, a process of capturing the pulse and extracting pulse characteristics.

According to an exemplary embodiment, the wearable device 100 may provide feedback to the user at the time of authentication success or authentication failure. The authentication success may represent the existence of a registered vein image, a registered iris image, and a registered pulse respectively matching with the captured vein image, the captured iris image, and the measured pulse. For example, at the time of the authentication success, the wearable device 100 may provide a vibration or a ringtone and may display, on the display unit 120, the message indicating the authentication success.

The wearable device 100 may log in a mail account of the user through the vein authentication. As illustrated in FIG. 23, when the user selects a Mail icon, the wearable device 100 may perform the vein authentication and may log in the mail account of the user wearing the wearable device 100 by inputting a registered ID and a registered password with respect to the identified user.

Figure 24:
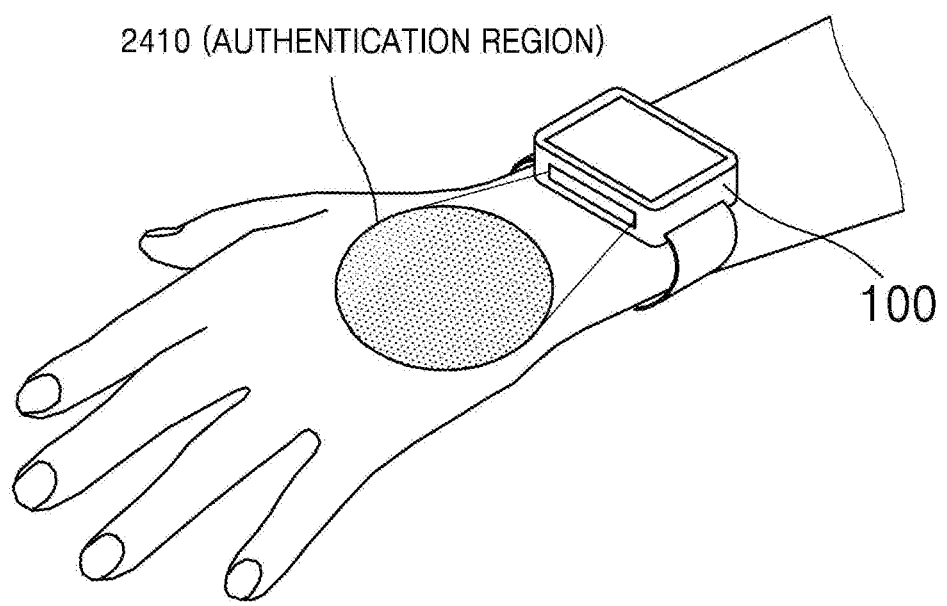
FIG. 24 is a diagram illustrating a process by which a wearable device displays an authentication region, according to an exemplary embodiment.

FIG. 24 is a diagram illustrating a process by which a wearable device 100 displays an authentication region, according to an exemplary embodiment. Referring to FIG. 24, when performing vein authentication, the wearable device 100 may display the authentication region 2410 capturing a vein image.

As illustrated in FIG. 24, the wearable device 100 may display an authentication region 2410 by using a laser or an LED. When performing the vein authentication, the wearable device 100 may display the authentication region 2410 in order to notify that a vein image in any region of the user wearing the wearable device 100 is captured.

Figure 25:
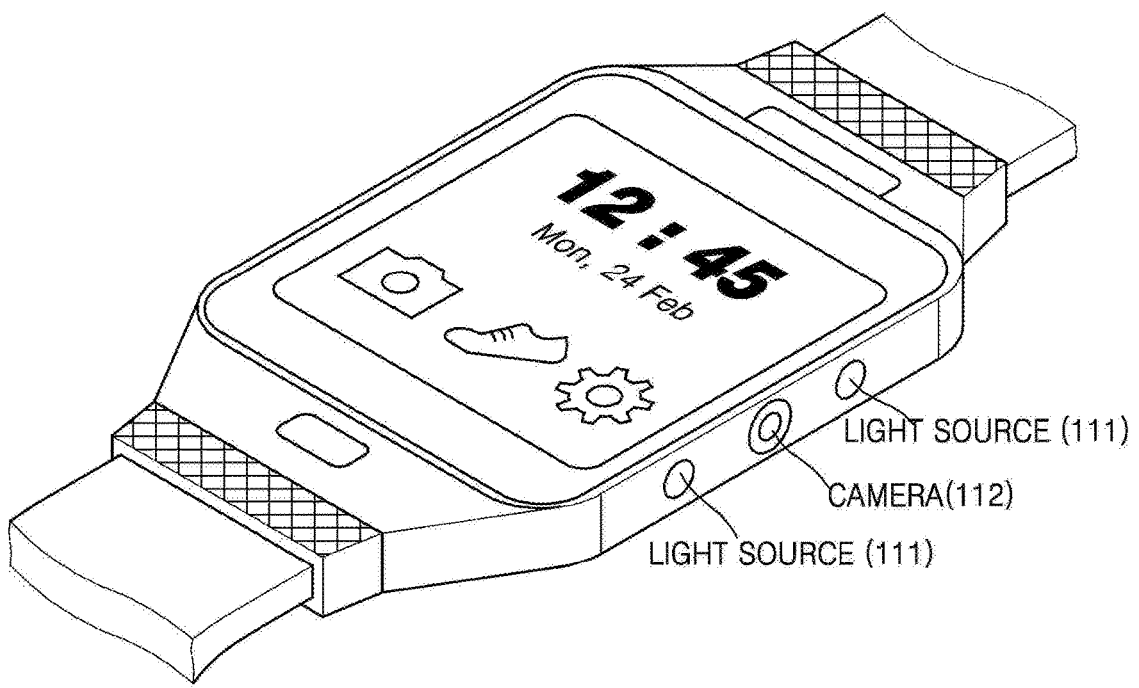
FIG. 25 is a diagram illustrating a sensor arrangement of a wearable device according to an exemplary embodiment.

FIG. 25 is a diagram of a sensor arrangement of a wearable device 100 according to an exemplary embodiment. For example, the wearable device 100 may include a sensor 110 on a side surface thereof, which may include at least one light source 111 and at least one camera 112.

In the case of a smart watch, the sensor 110 may be disposed on a side surface of the smart watch to capture a vein image of the back of a hand of a user wearing the smart watch. The smart watch may capture the vein image of the back of a user's hand or an image of a shape of a user's finger to perform authentication.

Figure 26:
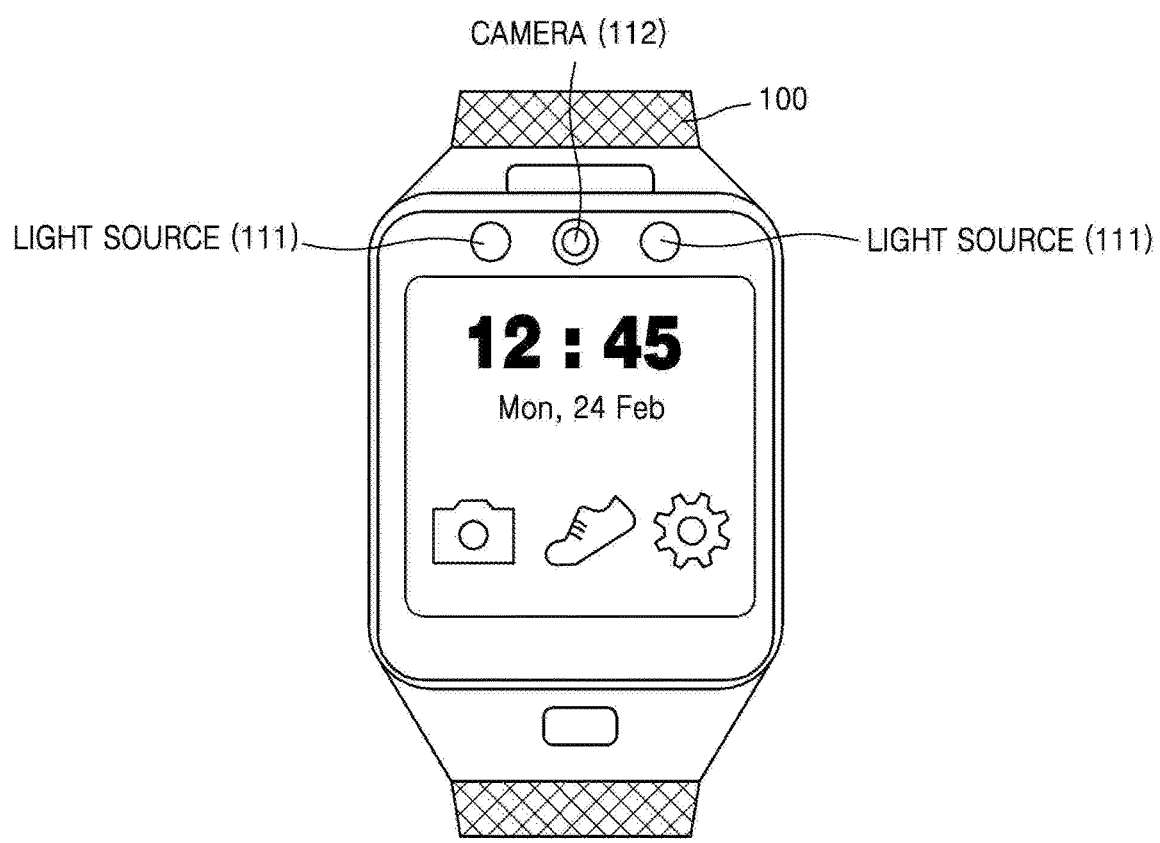
FIG. 26 is a diagram illustrating a sensor arrangement of a wearable device according to an exemplary embodiment.

FIG. 26 is a diagram of a sensor arrangement of a wearable device 100 according to an exemplary embodiment. For example, the wearable device 100 may include a sensor 110 on a front surface thereof, which may include at least one light source 111 and at least one camera 112.

In the case of a smart watch, the sensor 110 may be disposed on a front surface of the smart watch to capture an image of a body of a user wearing the smart watch. For example, the smart watch may capture a vein image of the back or the palm of the hand opposite of the hand wearing the smart watch. In addition, the smart watch may capture an iris image of the user by using the sensor 110 disposed on the front surface thereof to perform iris authentication.

Two light sources 111 and one camera 112 are described with reference to FIGS. 25 and 26, but the number of the light sources 111 and the cameras 112 is not limited thereto. FIGS. 25 and 26 illustrate that the camera 112 is disposed between the light sources 111, however the positions of the camera 112 and the light sources 111 are not limited to this configuration. In addition, the camera 112 or the light sources 111 may be arranged in an array form.

The wearable device according to one or more exemplary embodiments may provide a function and an application suitable for the user wearing the wearable device.

The wearable device according to one or more exemplary embodiments may grant authority to the user through vein authentication.

The wearable device according to one or more exemplary embodiments may include a processor, a memory configured to store and execute program data, a permanent storage unit such as a disc drive, a communication port configured to communicate with external devices, and a user interface such as a touch panel, a key, or a button. Methods, which are realized by a software module or algorithm, are computer-readable codes or program commands executable on the processor. The methods may be stored computer-readable recording mediums. Examples of the computer-readable recording mediums may include a magnetic storage medium (for example, a read-only memory (ROM), a random-access memory (RAM), a floppy disk, or a hard disk) and an optically readable medium (for example, a CD-ROM or a digital versatile disc (DVD)). The computer-readable recording mediums may be distributed in computer systems connected to each other through a network. Codes, which are readable by a computer through a distribution method, may be stored and executed in the computer-readable recording mediums. The computer-readable recording mediums may be readable by the computer, may be stored in the memory, and may be processed in the processor.

One or more exemplary embodiments may be represented by functional block configurations and various processing operations. The functional block configurations may be realized by a plurality of hardware and/or software configurations. For example, one or more exemplary embodiments may employ direct circuit configurations, such as a memory, processing, logic, and a look-up table, capable of executing various functions by a control of at least one microprocessor or other control devices. In the similar manner that elements may be executed by software programming or software elements, one or more exemplary embodiments may be realized by a programming or scripting language such as C, C++, Java, or an assembler, including a various of algorithm realized by a data structure, processes, routines, or combinations of other programming configurations. Functional aspects may be realized by algorithm executed in one or more processors. In addition, one or more exemplary embodiments may employ an existing art for an electronic environment setting, a signal processing, and/or a data processing. The terms "mechanism", "element", "means", and "configuration" may widely be used and are not limited to mechanical and physical configurations. The aforementioned terms may include means of a series of routines of software in conjunction with a processor or the like.

For conciseness, descriptions of conventional electronic configurations, control systems, software and other functional aspects of the systems may be omitted above. Furthermore, connections of lines between elements illustrated in the drawings or connection members are merely examples of functional connections and/or physical or circuit connections. In actual devices, the connections of the lines and the connection members may be implemented with various replaceable and/or additional functional connections, physical connections, or circuit connections. Moreover, unless an element is mentioned as specific terms such as "essential" or "important", the element may be an element not necessarily required for carrying out the inventive concepts.

The use of the term "the" or a similar definite term in the specification (in particular, in the claims) may correspond to both the singular and the plural. In addition, if a range is disclosed in the exemplary embodiments, exemplary embodiments to which individual values belonging to the range are applied may be included (if there is no disclosure opposite to this), and this is the same as if each of the individual values forming the range is disclosed.

For steps forming the methods according to the inventive concepts, if an order is not clearly disclosed or if there is no disclosure opposed to the clear order, the steps may be performed in any appropriate order. The inventive concepts are not necessarily limited to the disclosed order of the steps. The use of all illustrations or illustrative terms (for example, and the like, etc.) in the exemplary embodiments is to describe the exemplary embodiments in detail, and the scope of the inventive concepts is not limited due to the illustrations or illustrative terms unless they are limited by the claims. In addition, it should be understood by those of ordinary skill in the art that various modifications, combinations, and changes may be made according to design conditions and factors within the scope of the attached claims or the equivalents.

It should be understood that exemplary embodiments described herein should be considered in a descriptive sense only and not for purposes of limitation. Descriptions of features and/or aspects within each exemplary embodiment should typically be considered as available for other similar features or aspects in other exemplary embodiments.

While one or more exemplary embodiments have been described with reference to the figures, it should be understood by those of ordinary skill in the art that various changes in form and details may be made without departing from the spirit and scope as defined by the following claims.

What is claimed is:

1. A wearable device comprising:
   a display;
   a sensor configured to obtain a biometric information of a user;
   a memory configured to store at least one instruction; and
   at least one processor configured to execute the at least one instruction to:
      based on an event related to executing an application, identify execution of biometric authentication associated with the application;
      based on the identification, display a message indicating information corresponding to the biometric authentication to be performed in the wearable device;
      obtain, by the sensor, the biometric information of the user wearing the wearable device;
      identify authority using the obtained biometric information and registered biometric information stored in the memory; and
      display, by the display, a screen associated with the executed application based on the identified authority.

2. The wearable device of claim 1, wherein the application is an application in which the user is predesignated.

3. The wearable device of claim 1, wherein the message comprises a type of the biometric authentication.

4. The wearable device of claim 1, wherein the message comprises a capturing angle of the sensor with respect to the user.

5. The wearable device of claim 4, the at least one processor is further configured to execute the at least one instruction to:
   receive a user input; and
   modify the capturing angle of the sensor in response to the user input.

6. The wearable device of claim 1, wherein the biometric authentication comprises at least one of vein authentication or iris authentication.

7. The wearable device of claim 1, the at least one processor is further configured to execute the at least one instruction to:
   display a process of capturing and generating at least one of image based on the biometric information.

8. The wearable device of claim 7, the at least one processor is further configured to execute the at least one instruction to:
   display an image of cross-comparing the image based on the biometric information with a image based on the registered biometric information.

9. The wearable device of claim 1, wherein the event comprises receiving a user input, by an input unit, in order to execute the application.

10. The wearable device of claim 1,
    the at least one processor is further configured to execute the at least one instruction to:
    display, on a body of the user, an authentication region using a light module.

11. A method of operating a wearable device, the method comprising:
    based on an event related to executing an application, identifying execution of biometric authentication associated with the application;
    based on the identification, displaying a message indicating information corresponding to the biometric authentication to be performed in the wearable device;
    obtaining, by a sensor, the biometric information of a user wearing the wearable device;

identifying authority using the obtained biometric information and registered biometric information stored in a memory; and displaying, a screen associated with the executed application based on the identified authority.

12. The method of claim 11, wherein the application is an application in which the user is predesignated.

13. The method of claim 11, wherein the message comprises a type of the biometric authentication.

14. The method of claim 11, wherein the message comprises a capturing angle of the sensor with respect to the user.

15. The method of claim 14, further comprising:
receiving a user input; and
modifying the capturing angle of the sensor in response to the user input.

16. The method of claim 11, wherein the biometric authentication comprises at least one of vein authentication or iris authentication.

17. The method of claim 11, further comprising displaying a process of capturing and generating at least one of image based on the biometric information.

18. The method of claim 17, further comprising displaying an image of cross-comparing the image based on the biometric information with an image based on the registered biometric information.

19. The method of claim 11, wherein the event comprises receiving a user input, by an input unit, in order to execute the application.

20. The method of claim 11, further comprising displaying, on a body of the user, an authentication region using a light module.

* * * * *